(12) United States Patent
Kellogg et al.

(10) Patent No.: US 10,951,446 B2
(45) Date of Patent: *Mar. 16, 2021

(54) BACKSCATTER DEVICES INCLUDING EXAMPLES OF SINGLE SIDEBAND OPERATION

(71) Applicant: University of Washington, Seattle, WA (US)

(72) Inventors: Bryce Kellogg, Seattle, WA (US); Joshua R. Smith, Seattle, WA (US); Shyamnath Gollakota, Seattle, WA (US); Vamsi Talla, Seattle, WA (US); Vikram S. Iyer, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/072,858

(22) PCT Filed: Jan. 26, 2017

(86) PCT No.: PCT/US2017/015170
§ 371 (c)(1),
(2) Date: Jul. 25, 2018

(87) PCT Pub. No.: WO2017/132400
PCT Pub. Date: Aug. 3, 2017

(65) Prior Publication Data
US 2018/0375703 A1 Dec. 27, 2018

Related U.S. Application Data

(60) Provisional application No. 62/287,322, filed on Jan. 26, 2016, provisional application No. 62/292,088, filed on Feb. 5, 2016.

(51) Int. Cl.
*H04L 27/26* (2006.01)
*G01S 13/82* (2006.01)
(Continued)

(52) U.S. Cl.
CPC .......... *H04L 27/2602* (2013.01); *G01S 13/82* (2013.01); *H04B 1/50* (2013.01);
(Continued)

(58) Field of Classification Search
CPC ... H04L 27/2602; H04L 5/0007; H04L 27/34; G01S 13/82; H04J 2011/0009
See application file for complete search history.

(56) References Cited

U.S. PATENT DOCUMENTS 4,298,280 A 11/1981 Harney
4,916,460 A 4/1990 Powell
(Continued)

FOREIGN PATENT DOCUMENTS

EP 2976734 1/2016
WO 2014153516 A1 9/2014
(Continued)

OTHER PUBLICATIONS

US 10,187,177 B2, 01/2019, Gollakota et al. (withdrawn)
(Continued)

*Primary Examiner* — Samina F Choudhry
(74) *Attorney, Agent, or Firm* — Dorsey & Whitney LLP

(57) ABSTRACT

Examples described herein include devices and systems utilizing backscatter communication to generate transmissions in accordance with wireless communication protocols. Examples are described including single sideband operation, generation of a carrier wave using Bluetooth, downlink communication to a backscatter device, and combinations thereof.

11 Claims, 5 Drawing Sheets

(51) Int. Cl.
*H04B 1/50* (2006.01)
*H04L 5/00* (2006.01)
*H04L 27/34* (2006.01)
*H04J 11/00* (2006.01)

(52) U.S. Cl.
CPC ............ *H04L 5/0007* (2013.01); *H04L 27/26* (2013.01); *H04L 27/2634* (2013.01); *H04L 27/34* (2013.01); *H04J 2011/0009* (2013.01)

(56) References Cited

U.S. PATENT DOCUMENTS

| | | |
|---|---|---|
| 5,220,330 A | 6/1993 | Salvail et al. |
| 5,321,599 A | 6/1994 | Tanamachi et al. |
| 5,649,296 A | 7/1997 | Maclellan et al. |
| 5,663,710 A | 9/1997 | Fasig et al. |
| 5,995,040 A | 11/1999 | Issler et al. |
| 6,016,056 A * | 1/2000 | Seki ................. B29C 45/76 264/40.1 |
| 6,084,530 A | 7/2000 | Pidwerbetsky et al. |
| 6,094,450 A | 7/2000 | Shockey |
| 6,243,012 B1 | 6/2001 | Shober et al. |
| 6,259,408 B1 | 7/2001 | Brady et al. |
| 6,297,696 B1 | 10/2001 | Abdollahian et al. |
| 6,611,224 B1 | 8/2003 | Nysen et al. |
| 6,745,008 B1 | 6/2004 | Carrender et al. |
| 6,765,476 B2 | 7/2004 | Steele et al. |
| 6,838,989 B1 | 1/2005 | Mays et al. |
| 6,870,460 B2 | 3/2005 | Turner et al. |
| 6,970,089 B2 | 11/2005 | Carrender |
| 7,180,402 B2 | 2/2007 | Carrender et al. |
| 7,215,976 B2 | 5/2007 | Brideglall |
| 7,358,848 B2 | 4/2008 | Mohamadi |
| 7,469,013 B1 | 12/2008 | Bolt et al. |
| 7,535,360 B2 | 5/2009 | Barink et al. |
| 7,796,016 B2 | 9/2010 | Fukuda |
| 7,839,283 B2 | 11/2010 | Mohamadi et al. |
| 7,961,093 B2 | 6/2011 | Chiao et al. |
| 7,995,885 B2 | 8/2011 | Wang et al. |
| 8,026,839 B2 | 9/2011 | Weber |
| 8,120,465 B2 | 2/2012 | Drucker |
| 8,170,485 B2 | 5/2012 | Hulvey |
| 8,284,032 B2 | 10/2012 | Lee et al. |
| 8,391,824 B2 | 3/2013 | Kawaguchi |
| 8,526,349 B2 | 9/2013 | Fisher |
| 8,797,146 B2 | 8/2014 | Cook et al. |
| 8,952,789 B2 | 2/2015 | Dardari |
| 8,971,704 B2 | 3/2015 | Cavaliere et al. |
| 9,312,950 B1 | 4/2016 | Deyle |
| 9,357,341 B2 | 5/2016 | Deyle |
| 9,680,520 B2 | 6/2017 | Gollakota et al. |
| 9,973,367 B2 | 5/2018 | Gollakota et al. |
| 10,033,424 B2 | 7/2018 | Gollakota et al. |
| 10,079,616 B2 | 9/2018 | Reynolds et al. |
| 10,270,639 B2 | 4/2019 | Gollakota et al. |
| 2002/0015436 A1 | 2/2002 | Ovard et al. |
| 2003/0043949 A1 | 3/2003 | O'Toole et al. |
| 2003/0133495 A1 | 7/2003 | Lerner et al. |
| 2003/0174672 A1 | 9/2003 | Herrmann |
| 2004/0005863 A1 | 1/2004 | Carrender |
| 2004/0210611 A1 | 10/2004 | Gradishar et al. |
| 2005/0053024 A1 | 3/2005 | Friedrich |
| 2005/0099269 A1 | 5/2005 | Diorio et al. |
| 2005/0201450 A1 | 9/2005 | Volpi et al. |
| 2005/0248438 A1 | 11/2005 | Hughes et al. |
| 2005/0253688 A1 | 11/2005 | Fukuda |
| 2005/0265300 A1 | 12/2005 | Rensburg |
| 2006/0044147 A1 | 3/2006 | Knox et al. |
| 2006/0045219 A1 | 3/2006 | Wang et al. |
| 2006/0082458 A1 | 4/2006 | Shanks et al. |
| 2006/0087406 A1 | 4/2006 | Willins et al. |
| 2006/0109127 A1 | 5/2006 | Barink et al. |
| 2006/0220794 A1 | 10/2006 | Zhu |
| 2006/0236203 A1 | 10/2006 | Diorio et al. |
| 2006/0261952 A1 | 11/2006 | Kavounas et al. |
| 2007/0018904 A1 | 1/2007 | Smith |
| 2007/0046434 A1 | 3/2007 | Chakraborty |
| 2007/0069864 A1 | 3/2007 | Bae et al. |
| 2007/0096876 A1 | 5/2007 | Bridgelall et al. |
| 2007/0109121 A1 | 5/2007 | Cohen |
| 2007/0111676 A1 | 5/2007 | Trachewsky et al. |
| 2007/0115950 A1 | 5/2007 | Karaoguz et al. |
| 2007/0201786 A1 | 8/2007 | Wuilpart |
| 2007/0210923 A1 | 9/2007 | Butler et al. |
| 2007/0285245 A1 | 12/2007 | Djuric et al. |
| 2007/0293163 A1 | 12/2007 | Kilpatrick |
| 2008/0068174 A1 | 3/2008 | Al-mahdawi |
| 2008/0131133 A1 | 6/2008 | Blunt et al. |
| 2008/0136646 A1 | 6/2008 | Friedrich |
| 2008/0165007 A1 | 7/2008 | Drago et al. |
| 2008/0180253 A1 | 7/2008 | Ovard et al. |
| 2008/0207357 A1 | 8/2008 | Savarese et al. |
| 2008/0211636 A1 | 9/2008 | O'Toole et al. |
| 2008/0216567 A1 * | 9/2008 | Breed .................... B60N 2/888 73/146.5 |
| 2008/0225932 A1 | 9/2008 | Fukuda |
| 2008/0252442 A1 | 10/2008 | Mohamadi et al. |
| 2008/0278293 A1 | 11/2008 | Drucker |
| 2009/0201134 A1 | 8/2009 | Rofougaran |
| 2009/0243804 A1 | 10/2009 | Fukuda |
| 2009/0252178 A1 | 10/2009 | Huttunen et al. |
| 2010/0156651 A1 | 6/2010 | Broer |
| 2010/0271188 A1 | 10/2010 | Nysen |
| 2011/0053178 A1 | 3/2011 | Yang |
| 2011/0080267 A1 * | 4/2011 | Clare ...................... G01S 13/82 340/10.4 |
| 2012/0001732 A1 | 1/2012 | Kawaguchi |
| 2012/0002766 A1 | 1/2012 | Kawaguchi |
| 2012/0051411 A1 | 3/2012 | Duron et al. |
| 2012/0099566 A1 * | 4/2012 | Laine .................. H04M 1/7253 370/338 |
| 2012/0112885 A1 | 5/2012 | Drucker |
| 2012/0245444 A1 | 9/2012 | Otis et al. |
| 2012/0311072 A1 | 12/2012 | Huang et al. |
| 2012/0313698 A1 | 12/2012 | Ochoa et al. |
| 2013/0028305 A1 | 1/2013 | Gollakota et al. |
| 2013/0028598 A1 | 1/2013 | Cavaliere et al. |
| 2013/0069767 A1 | 3/2013 | Ovard et al. |
| 2013/0176115 A1 | 7/2013 | Puleston et al. |
| 2013/0215979 A1 | 8/2013 | Yakovlev et al. |
| 2013/0223270 A1 | 8/2013 | Cheng |
| 2013/0265140 A1 | 10/2013 | Gudan et al. |
| 2013/0286959 A1 | 10/2013 | Lou et al. |
| 2013/0299579 A1 * | 11/2013 | Manku ............... G06K 19/0723 235/439 |
| 2013/0322498 A1 | 12/2013 | Maquire |
| 2014/0016719 A1 * | 1/2014 | Manku .................... H01Q 7/00 375/295 |
| 2014/0044233 A1 | 2/2014 | Morton |
| 2014/0113561 A1 | 4/2014 | Maguire |
| 2014/0313071 A1 | 10/2014 | Mccorkle |
| 2014/0357202 A1 | 12/2014 | Malarky |
| 2014/0364733 A1 | 12/2014 | Huang et al. |
| 2015/0091706 A1 | 4/2015 | Chemishkian et al. |
| 2015/0108210 A1 | 4/2015 | Zhou |
| 2015/0168535 A1 * | 6/2015 | Huttner .................... G01S 3/48 342/147 |
| 2015/0311944 A1 | 10/2015 | Gollakota et al. |
| 2015/0381269 A1 | 12/2015 | Deyle |
| 2016/0094933 A1 | 3/2016 | Deyle |
| 2016/0266245 A1 | 9/2016 | Bharadia et al. |
| 2016/0365890 A1 | 12/2016 | Reynolds et al. |
| 2017/0180075 A1 | 6/2017 | Gollakota et al. |
| 2017/0180178 A1 | 6/2017 | Gollakota et al. |
| 2017/0180703 A1 | 6/2017 | Kovacovsky et al. |
| 2017/0331509 A1 | 11/2017 | Gollakota et al. |
| 2018/0331865 A1 | 11/2018 | Ziv et al. |
| 2018/0358996 A1 | 12/2018 | Gollakota et al. |
| 2019/0116078 A1 | 4/2019 | Gollakota et al. |
| 2019/0158341 A1 | 5/2019 | Talla et al. |
| 2020/0125916 A1 | 4/2020 | Karani et al. |
| 2020/0212956 A1 | 7/2020 | Gollakota et al. |

(56) References Cited

U.S. PATENT DOCUMENTS

FOREIGN PATENT DOCUMENTS

| WO | 2015123306 A1 | 8/2015 |
|---|---|---|
| WO | 2015123341 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |
| WO | 2018075653 A1 | 4/2018 |
| WO | 2018187737 A1 | 10/2018 |

OTHER PUBLICATIONS

US 10,187,241 B2, 01/2019, Gollakota et al. (withdrawn)
Partial Supplementary European Search Report dated Aug. 13, 2019 for EP Application No. 17744905.5, 15 pages.
Kellogg, A. Parks, S. Gollakota, J. R. Smith, and D. Wetherall. "Wi-fi backscatter: Internet connectivity for rf-powered devices". In Proceedings of the 2014 ACM Conference on SIGCOMM, Aug. 2014.
Ying and Z. Fu-Hong. "A System Design for UHF RFID Reader". In Communication Technology, 2008. ICCT 2008. 11th IEEE International Conference on, pp. 301-304. IEEE, Nov. 2008.
Cadence, "Cadence Spectre RF Option", http://www.cadence.com/products/rf/spectre_rf_simulation/pages/default.aspx. (Retrieved Jul. 19, 2018).
Bharadia, K. R. Joshi, M. Kotaru, and S. Katti. "Backfi: High Throughput WiFi Backscatter". In Proceedings of the 2015 ACM Conference on Special Interest Group on Data Communication, Aug. 2015.
Digipoints. DigiPoints Series vol. 1 Leader Guide Module 9—Network Architectures. Sep. 18, 2015, pp. 9.i-9.18.
Lu, G. M. Voelker, and A. C. Snoeren. "Slomo: Down clocking WiFi Communication". In NSDI, pp. 255-258, Apr. 2013.
Lu, P. Ling, G. M. Voelker, and A. C. Snoeren. "Enfold: Downclocking OFDM in WiFi". In Proceedings of the 20th annual international conference on Mobile computing and networking, pp. 129-140. ACM, Sep. 2014.
IEEE, "IEEE Standard for Ethernet", http://standards.ieee.org/getieee802/download/802.11-2012.pdf., Dec. 28, 2012.
Ensworth and M. Reynolds. "Every smart phone is a backscatter reader: Modulated backscatter compatibility with bluetooth 4.0 low energy (ble) devices". 2015 IEEE International Conference on RFID. (Retrieved Jul. 19, 2018).
Proakis and M. Salehi. "Digital communications". 2005. McGraw-Hill, New York. (Retrieved Jul. 19, 2018).
Manweiler and R. Roy Choudhury. "Avoiding the Rush Hours: Wifi Energy Management via Traffic Isolation". In MobiSys, Jul. 2011.
Rattner, "Connecting the Future: It's a Wireless World", Sep. 2013.
Greene. "Intel's Tiny Wi-Fi Chip Could Have a Big Impact". MIT Technology review, Sep. 21, 2012.
Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).
NASA, "A Wi-Fi Reflector Chip to Speed Up Wearables", http://www.jpl.nasa.gov/news/news.php?feature=4663. Jul. 22, 2015.
Khannur, X. Chen, D. L. Yin, D. Shen, B. Zhao, M. K. Raja, Y. Wu, R. Sindunata, W. G. Yeoh, and R. Singh. "A Universal UHF RFID reader IC in 0.18-μm CMOS Technology". Solid-State Circuits, IEEE Journal of, 43(5):1146-1155, May 2008.
PCT Application No. PCT/US2018/026545 titled 'Image and/or Video Transmission Using Backscatter Devices' filed on Apr. 6, 2018.
Qualcomm, "AR9462 Single-chip, 2.4/5GHz, 2-stream 802.11a/b/g/n and BT 4.0 + HS SoC Solution with SST Technology", http://www.qca.qualcomm.com/wp-content/uploads/2013/11/AR9462.pdf. (Retrieved Jul. 19, 2018).

Qualcomm. "QCA4002/4004 Qualcomm low-power Wi-Fi", http://www.eeworld.com.cn/zt/wireless/downloads/QCA4002-4004FIN.pdf. (Retrieved Jul. 19, 2018).
Mittal, A. Kansal, and R. Chandra. Empowering developers to estimate app energy consumption. In MobiCom, Aug. 2012.
Merritt, "Atheros targets cellphone with Wi-Fi chip", EE Times (Nov. 2, 2009), http://www.eetimes.com/document.asp?doc_id=1172134.
Chokshi, "Yes! Wi-Fi and Bluetooth Can Coexist in Handheld Devices", Emerging and Embedded Business Unit, Marvell Semiconductor, Inc., Mar. 2010.
Synopsys, "Concurrent Timing, Area, Power and Test Optimization", http://www.synopsys.com/Tools/lmplementation/RTLSynthesis/DesignComplier/Pages/default.aspx. (Retrieved Jul. 19, 2018).
U.S. Appl. No. 15/752,214 entitled 'Backscatter Devices and Network Systems Incorporating Backscatter Devices' filed Feb. 12, 2018, pp. all.
"Altera de1 fpga development board", http://www.terasic.com.tw/cgi-bin/page/archive.pl?No=83.(Retrieved Jul. 19, 2018).
"Analog Devices HMC190BMS8/1908MS8E", https://www.hittite.com/content/documents/data_sheet/hmc190bms8.pdf. (Retrieved Jul. 19, 2018).
"Nest Cam Indoor", https://nest.com/camera/meet-nest-cam/?dropcam=true. 2018. (Retrieved Jul. 19, 2018).
U.S. Appl. No. 15/958,880 titled 'Apparatuses, Systems, and Methods for Communicating Using MIMO and Spread Spectrum Coding in Backscatter of Ambient Signals' filed Apr. 20, 2018.
"Advanced Television Systems Committee (ATSC) (Sep. 1995) "ATSC Digital Television Standard," ATSC Doc. A/53, 74 pages", Sep. 1995.
"Analog Devices (retrieved Apr. 2016) "ADG919 RF Switch Datasheet," available online at: http://www.datasheet-pdf.com/PDF/ADG919-Datasheet-AnalogDevices-140819", Apr. 2016.
"Analog Devices, Inc. (retrieved Jan. 2016) "ADG902 RF switch datasheet," available online at: http://www.analog.com/static/imported-files/data_sheets/adg901_902.pdf", Jan. 2016.
"Axcera.com (retrieved Jan. 2016) "8VSB vs. COFDM," available online at: http://www.axcera.com/downloads/technotes-whitepapers/technote_4.pdf", Jan. 2016.
"DiBEG (May 2014; retrieved Jan. 2016) "The Launching Country," available online at: http://www.dibeg.org/world/world.html", May 2014.
"E. Inc. (retrieved Apr. 2016) "Universal software radio peripheral," available online at: http://ettus.com", Apr. 2016.
"Encounternet (retrieved Jan. 2016) "The Encounternet Project," available online at: http://encounternet.net/", Jan. 2016.
"Federal Communications Commission (retrieved Jan. 2016) "41 dBu service contours around ASRN 1226015, FCC TV query database," available online at: http://transition.fcc.gov/fcc-bin/tvq?list=0&facid=69571", Jan. 2016.
"International Search Report and Written Opinion dated Jun. 6, 2017 for PCT application No. PCT/US2017/015170".
"Invitation to Pay Additional Fees dated Mar. 27, 2017 for PCT Application No. PCT/US2017/015170, pp. 3."
"STMicroelectronics (Jul. 2012) "TS 881 Datasheet," 1 page", Jul. 2012.
Anthony,, Sebastian , ""Free energy harvesting from TV signals, to power a ubiquitous internet of things"", ExtremeTech, google search, Jul. 8, 2013, 8 pages, Jul. 8, 2013.
Bharadia, et al., ""Full duplex backscatter"", Proceedings of the 12th ACM Workshop on Hot Topics in Networks, Article No. 4, pp. 1-7, Nov. 2013.
Bharadia, et al., ""Full duplex radios"", Proceedings of the ACM SIGCOMM 2013 (SIGCOMM '13), pp. 375-386, Aug. 2013.
Bohorouez, et al., ""A 350μW CMOS MSK transmitter and 400μW OOK super-regenerative receiver for medical implant communications"", IEEE Journal of Solid-State Circuits, 44(4):1248-1259, Apr. 2009.
Buettner, ""Backscatter Protocols and Energy-Efficient Computing for RF-Powered Devices"", PhD Thesis, University of Washington, Seattle, WA, 144 pages, Retrieved Jan. 2016., 2012.

(56) References Cited

OTHER PUBLICATIONS

Buettner, et al., ""Dewdrop: An energy-aware runtime for computational RFID"", Proceedings of the 8th USENIX Conference on Networked Systems Design and Implementation (NSDI'11), pp. 197-210, Mar. 2011.

Buettner, et al., ""RFID Sensor Networks with the Intel WISP"", Proceedings of the 6th ACM Conference on Embedded Network Sensor Systems (SenSys '08), pp. 393-394, Nov. 2008.

Chen, et al., Denis Guangyin Chen et al, "Pulse-Modulation Imaging—Review and Performance Analysis", IEEE Transactions on Biomedical Circuits and Systems, vol. 5, No. 1, Feb. 2011, at 64.

Dayhoff, ""New Policies for Part 15 Devices"", Federal Communications Commission (FCC) Telecommunications Certification Body Council (TCBC) Workshop 2005, 13 pages, May 2005.

Dementyev, et al., ""Wirelessly Powered Bistable Display Tags"", ACM International Joint Conference on Pervasive and Ubiquitous Computing (UbiComp '13), pp. 383-386, Sep. 2013.

Dementyev, A. et al., ""A Wearable UHF RFID-Based EEG System"", 2013 IEEE International Conference on RFID (RFID), pp. 1-7, Apr.-May 2013.

Duarte, et al., ""Full-duplex wireless communications using off-the-shelf radios: Feasibility and first results"", 2010 Conference Record of the 44th Asilomar Conference on Signals, Systems and Computers (ASILOMAR), pp. 1558-1562, Nov. 2010.

Duarte, "Full-duplex Wireless: Design, Implementation and Characterization", Ph.D. thesis, Rice University, 70 pages, Apr. 2012.

Duc, et al., ""Enhancing Security of EPCGlobal Gen-2 RFID against Traceability and Cloning"", Auto-ID Labs Information and Communication University, Auto-ID Labs White Paper No. WP-SWNET-016, 11 pages, Retrieved Jan. 2016., 2006.

Elliott, ""Average U.S. Home Now Receives a Record 118.6 TV Channels, According to Nielsen"", available online at: http://www.nielsen.com/us/en/insights/pressroom/2008/average_u_s_home.html, Jun. 2008.

Gorlatova, et al., ""Energy harvesting active networked tags (EnHANTs) for ubiquitous object networking"", IEEE Wireless Communications, 17(6):18-25, Dec. 2010.

Guo, et al., ""Virtual full-duplex wireless communication via rapid on-off-division duplex"", 48th Annual Allerton Conference on Communication, Control, and Computing (Allerton), pp. 412-419, Sep.-Oct. 2010.

Jain, et al., ""Practical, real-time, full duplex wireless"", Proceedings of the 17th Annual International Conference on Mobile Computing and Networking (MobiCom'11), pp. 301-312, Sep. 2011.

Javed, et al., Sajid Javed et al, Background Subtraction Via Superpixel-Based Online Matrix Decomposition With Structured Foreground Constraints, ICCVW '15 Proceedings of the 2015 IEEE International Conference on Computer Vision Workshop, Dec. 2015.

Johnston, Scott , "Software Defined Radio Hardware Survey", Oct. 2011, 31 pgs.

Kellogg, et al., ""Bringing gesture recognition to all devices"", Proceedings of the 11th USENIX Conference on Network Systems Design and Implementation (NSDI'14), pp. 303-316, Apr. 2014.

Kellogg, et al., "Wi-Fi Backscatter; Internet Connectivity for RF-Powered Devices", University of Washington, SIGCOMM'14, Aug. 17-22, 2014.

Kim, et al., ""Flush: a reliable bulk transport protocol for multihop wireless networks"", Proceedings of the 5th International Conference on Embedded Networked Sensor Systems (SenSys '07), pp. 351-365, Nov. 2007.

Kleinrock, et al., ""Packet Switching in Radio Channels: Part I—Carrier Sense Multiple-Access Modes and Their Throughput-Delay Characteristics"", IEEE Transactions on Communications, 23(12):1400-1416, Dec. 1975.

Kodialam, et al., ""Fast and reliable estimation schemes in RFID systems"", Proceedings of the 12th Annual International Conference on Mobile Computing and Networking (MobiCom '06), pp. 322-333, Sep. 2006.

Koomey, JG et al., ""Implications of Historical Trends in the Electrical Efficiency of Computing"", IEEE Annals of the History of Computing, 33(3):46-54, Aug. 2011.

Kuester, et al., ""Baseband Signals and Power in Load-Modulated Digital Backscatter," IEEE Antenna and Wireless Propagation Letter, vol. II, 2012, pp. 1374-1377, Nov. 2012."

Lazarus, , ""Remote, wireless, ambulatory monitoring of implantable pacemakers, cardioverter defibrillators, and cardiac resynchronization therapy systems: analysis of a worldwide database"", Pacing and Clinical Electrophysiology, 30(Suppl 1):S2-S12, Jan. 2007.

Liang, et al., ""Surviving wi-fi interference in low power zigbee networks"", Proceedings of the 8th ACM Conference on Embedded Networked Sensor Systems (SenSys '10), pp. 309-322, Nov. 2010.

Liu, et al., ""Ambient Backscatter: Wireless Communication Out of Thin Air," University of Washington, no date, date retrieved Jan. 11, 2016, pp. 1-12."

Liu, et al., ""Ambient Backscatter: Wireless Communication out of Thin Air"", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.

Liu, et al., ""Digital Correlation Demodulator Design for RFID Reader Receiver"", IEEE Wireless Communications and Networking Conference (WCNC 2007), pp. 1666-1670, Mar. 2007.

Liu, et al., ""Enabling Instantaneous Feedback with Full-duplex Backscatter"", Proceedings of the 20th Annual International Conference on Mobile Computing and Networking (MobiCom'14), pp. 67-78, Sep. 2014.

Mace, ""Wave reflection and transmission and transmission in beams"", Journal of Sound and Vibration, 97(2):237-246, Nov. 1984.

Mastrototaro, ""The MiniMed Continuous Glucose Monitoring System"", Diabetes Technology & Therapeutics, 2(Suppl 1):13-18, Dec. 2000.

Metcalfe, et al., ""Ethernet: Distributed packet switching for local computer networks"", Communications of the ACM, 19(7):395-404, Jul. 1976.

Mishra, et al., ""Supporting continuous mobility through multi-rate wireless packetization"", Proceedings of the 9th Workshop on Mobile Computing Systems and Applications (HotMobile '08), pp. 33-37, Feb. 2008.

Murray Associates, "The Great Seal Bug Part 1" Murray Associates, Mar. 2017.

Mutti, et al., ""CDMA-based RFID Systems in Dense Scenarios: Concepts and Challenges"", 2008 IEEE International Conference on RFID, pp. 215-222, Apr. 2008.

Naderiparizi, et al., Saman Naderiparizi etal, "Ultra-Low-Power Wireless Streaming Cameras", arxiv:1707.08718v1, Jul. 27, 2017, Cornell University Library.

Navaneethan, et al., Navaneethan, VM. Security Enhancement of Frequency Hopping Spread Spectrum Based on Oqpsk Technique. IOSR Journal of Electronics and Communication Engineering. May 2016. 62.

Nikitin, et al., ""Passive tag-to-tag communication"", 2012 IEEE International Conference on RFID (RFID), pp. 177-184, Apr. 2012.

Nikitin, et al., ""Theory and measurement of backscattering from RFID tags"", IEEE Antennas and Propagation Magazine, 48(6):212-218, Dec. 2006.

Obeid, et al., ""Evaluation of spike-detection algorithms for a brain-machine interface application"", IEEE Transactions on Biomedical Engineering, 51(6):905-911, Jun. 2004.

Occhiuzzi, et al., ""Modeling, Design and Experimentation of Wearable RFID Sensor Tag"", IEEE Transactions on Antennas and Propagation, 58(8):2490-2498, Aug. 2010.

Pandey, et al., ""A Sub-100 µW MICS/ISM Band Transmitter Based on Injection-Locking and Frequency Multiplication"", IEEE Journal of Solid-State Circuits, 46(5):1049-1058, May 2011.

Parks, et al., ""A wireless sensing platform utilizing ambient RF energy"", 2013 IEEE Topical Conference on Biomedical Wireless Technologies, Networks, and Sensing Systems (BioWireleSS). pp. 154-156, Jan. 2013.

(56) References Cited

OTHER PUBLICATIONS

Parks, et al., ""A Wireless Sensing Platform Utilizing Ambient RF Energy"", 2013 IEEE Topical Conference on Wireless Sensor Networks (WiSNet), pp. 127-129, Jan. 2013.
Parks, Aaron N. et al., "Turhocharging Ambient Backscatter Communication", SIGCOMM, Aug. 2014, 1-12.
Pillai, et al., ""An Ultra-Low-Power Long Range Battery/Passive RFID Tag for UHF and Microwave Bands With a Current Consumption of 700 nA at 1.5 V"", IEEE Transactions on Circuits and Systems I. Regular Papers, 54(7):1500-1512, Jul. 2007.
Qing, et al., ""A folded dipole antenna for RFID"", IEEE Antennas and Propagation Society International Symposium, 1:97-100, Jun. 2004.
Rabaey, et al., ""PicoRadios for wireless sensor networks: the next challenge in ultra-low power design"", 2002 IEEE International Solid-State Circuits Conference, Digest of Technical Papers (ISSCC), 1:200-201, Feb. 2002.
Ransford, et al., ""Mementos: system support for long-running computation on RFID-scale devices"", ACM SIGPLAN Notices—Proceedings of the 16th International Conference on Architecturla Support for Programming Languages and Operating Systems (ASPLOS '11), 46(3):159-170, Mar. 2011.
Rao, KVS et al., ""Antenna design for UHF RFID tags: a review and a practical application"", IEEE Transactions on Antennas and Propagation, 53(12):3870-3876, Dec. 2005.
Roy, et al., ""RFID: From Supply Chains to Sensor Nets"", Proceedings of the IEEE, 98(9):1583-1592, Jul. 2010.
Sample, et al., ""Design of an RFID-Based Battery-Free Programmable Sensing Platform"", IEEE Transactions on Instrumentation and Measurement, 57(11):2608-2615, Nov. 2008.
Sample, et al., ""Experimental results with two wireless power transfer systems"", IEEE Radio and Wireless Symposium (RAWCON), pp. 16-18, Jan. 2009.
Seigneuret, et al., ""Auto-tuning in passive UHF RFID tags"", 2010 8th IEEE International NEWCAS Conference (NEWCAS), pp. 181-184, Jun. 2010.
Sen, et al., ""CSMA/CN: Carrier sense multiple access with collision notification"", Proceedings of the 16th Annual International Conference on Mobile Computing and Networking (MobiCom'10), pp. 25-36, Sep. 2010.
Smith, JR et al., ""A wirelessly-powered platform for sensing and computation"", ACM International Joint Conference on Pervasive and Ubiquitous Computing (UbiComp 2006), 4206:495-506, Sep. 2006.
So, et al., ""Multi-channel mac for ad hoc networks; handling multi-channel hidden terminals using a single transceiver"", Proceedings of the 5th ACM International Symposium on Mobile Ad Hoc Networking and Computing, pp. 222-233, May 2004.
Srinivasan, et al., ""An empirical study of low-power wireless"", ACM Transactions on Sensor Networks (TOSN), vol. 6, Issue 2, Article No. 16, Feb. 2010.
Thomas, et al., ""A 96 Mbit/sec, 15.5 pJ/bit 16-QAM modulator for UHF backscatter communication"", 2012 IEEE International Conference on RFID (RFID), IEEE RFID Virtual Journal, pp. 185-190, Apr. 2012.
Tubalshat, et al., ""Sensor networks: an overview"", IEEE Potentials, 22(2):20-23, Apr.-May 2003.
Walden, , ""Analog-to-digital converter survey and analysis"", IEEE Journal on Selected Areas in Communications, 17(4):539-550, Apr. 1999.
Welbourne, et al., ""Building the Internet of Things Using RFID: The RFID Ecosystem Experience"", IEEE Internet Computing, 13(3):48-55, May-Jun. 2009.
Wuu, et al., ""Zero-Collision RFID Tags Identification Based on CDMA"", 5th International Conference on Information Assurance and Security (IAS '09), pp. 513-516, Aug. 2009.
Yi, et al., ""Analysis and Design Strategy of UHF Micro-Power CMOS Rectifiers for Micro-Sensor and RFID Applications"", IEEE Transactions on Circuits and Systems I: Regular Papers, 54(1):153-166, Jan. 2007.
Zalesky, et al., ""Integrating segmented electronic paper displays into consumer electronic devices"", 2011 IEEE International Conference on Consumer Electronics (ICCE), pp. 531-532, Jan. 2011.
Zhang, et al., ""Frame retransmissions considered harmful: improving spectrum efficiency using micro-ACKs"", Proceedings of the 18th Annual International Conference on Mobile Computing and Networking (MobiCom '12), pp. 89-100, Aug. 2012.
Zhang, et al., "EkhoNet: High Speed Ultra Low-power Backscatter for Next Generation Sensors", School of Computer Science, University of Massachusetts, Amherst, MA 01003, Sep. 2014.
U.S. Appl. No. 16/343,088 titled "Backscatter Systems, Devices, and Techniques Utilizing CSS Modulation and/or Higher Order Harmonic Cancellation" filed Apr. 18, 2019.
Analog devices—rf/if circuits. http://www.analog.com/library/analogDialogue/archives/43-09/EDCh%204%20rf%20if.pdf.
Andrews, et al., A Passive Mixer-First Receiver With Digitally Controlled and Widely Tunable RF Interface, IEEE Journal of Solid-State Circuits, vol. 45, No. 12, Dec. 2010, p. 2696-2708.
Kellogg, et al., Passive Wi-Fi: Bringing Low Power to Wi-Fi Transmissions, Proceedings of the 13th USENIX Symposium on Networked Systems Design and Implementation, Mar. 2016, 15 pages.
Marki, et al., Mixer Basics Primer: A Tutorial for RF & Microwave Mixers, Marki Microwave, Inc., 2010, 12 pages.
Talla, et al., Hybrid Analog-Digital Backscatter: A New Approach for Battery-Free Sensing, IEEE International Conference on RFID, May 2013, 8 pages.
Extended European Search Report for EP Application No. 17744905.5 dated Nov. 13, 2019.

\* cited by examiner

BACKSCATTER DEVICES INCLUDING EXAMPLES OF SINGLE SIDEBAND OPERATION

CROSS-REFERENCE TO RELATED APPLICATION(S)

This application is a 35 U.S.C. § 371 National Stage Application of PCT Application No. PCT/US2017/015170, filed Jan. 26, 2017, which claims the benefit under 35 U.S.C. § 119 of the earlier filing date of U.S. Provisional Application Ser. No. 62/287,322 filed Jan. 26, 2016, the entire contents of which are hereby incorporated by reference, in their entirety, for any purpose. PCT Application No. PCT/US2017/015170 also claims the benefit under 35 U.S.C. § 119 of the earlier filing date of U.S. Provisional Application Ser. No. 62/292,088 filed Feb. 5, 2016. The entire contents of all the aforementioned applications are hereby incorporated by reference, in their entirety, for any purposes.

STATEMENT REGARDING FEDERALLY SPONSORED RESEARCH OR DEVELOPMENT

This invention was made with government support under grant CNS-1407583 awarded by the National Science Foundation and grant CNS-1305072 awarded by the National Science Foundation. The government has certain rights in the invention.

TECHNICAL FIELD

Examples described herein relate generally to wireless communication. Examples of backscatter devices including single sideband operation are described.

BACKGROUND

Communication in accordance with wireless communication protocols (e.g. Wi-Fi, Bluetooth, ZigBee, SigFox) may drive the power budgets of sensors or other communicating devices. The power required for such communication may be prohibitive to fully implementing a variety of Internet of Things ("IoT"), or other ubiquitous sensing scenarios. While CMOS technology scaling has conventionally provided exponential benefits for the size and power consumption of digital logic systems, analog RF components, that are necessary for Wi-Fi communication, have not seen a similar power scaling. As a result, Wi-Fi transmissions on sensors and mobile devices still consume hundreds of milliwatts of power.

Backscattering techniques have been described that create an additional narrowband data stream to ride on top of existing Wi-Fi signals. However the devices are typically limited by low data rates at close by distances or require the use of custom full-duplex hardware at the receiver such that communications could not be received by any existing Wi-Fi device.

SUMMARY

Examples of backscatter devices are described herein. In some examples, a backscatter device includes an antenna configured to backscatter a carrier signal having a first frequency. The backscatter device further includes baseband circuitry configured to provide data for transmission. The backscatter device further includes a waveform generator configured to provide a waveform having a second frequency, wherein the second frequency is an absolute difference between the first frequency and a third frequency. The backscatter device further includes a sub-carrier phase modulator coupled to the baseband circuitry and the waveform generator, the sub-carrier phase modulator configured to adjust a phase, amplitude, or combinations thereof, of the waveform in accordance with the data to provide an output signal. The backscatter device further includes a switch coupled to the antenna, the switch configured to control an impedance of the backscatter device to backscatter the carrier signal in accordance with the output signal such that the first frequency is mixed with the second frequency to transmit the data in a backscatter signal in a single sideband at the third frequency.

In some examples, the backscatter signal is arranged in accordance with a wireless communication protocol implementing phase-shift keying, amplitude-shift keying, or combinations thereof.

In some examples, the wireless communication protocol comprises Wi-Fi, ZigBee, SigFox, or combinations thereof.

In some examples, wherein the waveform comprises two square waves including a first square wave and a second square wave, the second square wave shifted one quarter phase from the first square wave.

In some examples, the data comprises a Wi-Fi packet.

In some examples, the backscatter device further includes a plurality of impedance elements, and the switch is configured to switch between the plurality of impedance elements.

In some examples, the switch is configured to control the impedance of the backscatter device to transmit the data in the backscatter signal in the single sideband at the third frequency, wherein the third frequency is equal to the first frequency plus the second frequency without transmitting another sideband at a fourth frequency equal to the first frequency minus the second frequency.

Examples of systems are described herein. In some examples a system may include a helper device configured to transmit a carrier signal including a first frequency, and a backscatter device configured to backscatter the carrier signal using sub-carrier modulation with a waveform having a second frequency, the backscatter device further configured to switch impedances of the backscatter device to backscatter the carrier signal into a backscatter signal at a third frequency, the third frequency equal to either a sum or subtraction of the first and second frequencies, without providing a backscatter signal at a fourth frequency equal to an other of the sum or subtraction of the first and second frequencies. The system may further include a receiver configured to receive the backscatter signal at the third frequency.

In some examples, the backscatter device is further configured to provide data in the backscatter signal using phase shift keying, amplitude shift keying, or combinations thereof.

In some examples, the backscatter device is configured to switch between four different impedances to backscatter the carrier signal.

Examples of helper devices are described herein. In some examples, a helper device includes an antenna, a data whitener coupled to the antenna and configured to whiten input data in accordance with a Bluetooth standard, at least one processor, and at least one computer readable medium encoded with executable instructions, which, when executed, cause the at least one processor to perform operations comprising providing a sequence of data to the data whitener which, when operated on by the data whitener, produces a string of 1s or 0s.

In some examples, the executable instructions, when executed, cause the at least one processor to calculate a whitening sequence and utilize the whitening sequence to provide the sequence of data to the data whitener.

In some examples, the executable instructions, when executed, cause the at least one processor to calculate the whitening sequence based, at least in part, on a Bluetooth channel number.

In some examples, the data whitener comprises a 7-bit linear feedback shift register.

In some examples, the helper device further includes a transmitter coupled to the data whitener and the antenna, the transmitter configured to transmit data in accordance with the Bluetooth standard, and the transmitter configured to transmit the string of 1s or 0s such that the antenna provides a carrier wave having a single tone.

Further examples of systems are described herein. An example system includes a helper device configured to transmit a carrier signal including a Bluetooth packet comprising a string of 0s or 1s encoded with a Bluetooth standard to provide a single tone portion of the carrier signal, and a backscatter device configured to backscatter the carrier signal using sub-carrier modulation with a waveform having a second frequency, the backscatter device further configured to switch impedances of the backscatter device to backscatter the carrier signal into a backscatter signal at a third frequency, the third frequency equal to either a sum or subtraction of the first and second frequencies. The backscatter device may include an envelope detector configured to provide a control signal responsive to detection of a threshold amount of incident energy at the backscatter device, and the backscatter device may be configured to begin backscattering a guard interval after the detection of the threshold amount of incident energy at the backscatter device.

In some examples, the detection of the threshold amount of incident energy corresponds with a start of the Bluetooth packet.

In some examples, the guard interval is selected such that backscattering begins during a payload portion of the Bluetooth packet.

In some examples, the backscatter device is further configured to complete backscattering prior to receipt of a CRC portion of the Bluetooth packet.

In some examples, the helper device is configured to transmit a signal configured to reserve a Wi-Fi channel prior to transmitting the carrier signal.

In some examples, the carrier signal is included in a Bluetooth advertising packet and wherein the backscatter device is configured to backscatter a request to send (RTS) packet.

Examples of electronic devices are described herein. In some examples, an electronic device includes a transmitter configured to transmit Wi-Fi packets, and a controller configured to control the transmitter to produce an amplitude modulated signal in a payload of at least one of the Wi-Fi packets.

In some examples, the controller is configured to control the transmitter to produce random OFDM symbols or constant OFDM symbols.

In some examples, the constant OFDM symbols are produced using a string of QAM-modulated bits having all 1s or all 0s.

In some examples, the transmitter includes an IFFT configured to operate on QAM-modulated bits to provide an output signal comprising at least a portion of the at least one of the Wi-Fi packets, a scrambler configured to scramble input bits to provide scrambled bits, a convolutional encoder configured to encode the scrambled bits to provide encoded scrambled bits, an interleaver configured to interleave the encoded scrambled bits to provide interleaved bits, and a modulator configured to modulate the interleaved bits to provide the QAM-modulated bits. The controller may be configured to provide the input bits, the controller configured to select the input bits such that at selected times the QAM-modulated bits are a string of all 0s or all 1s.

In some examples, the controller is configured to control the transmitter to provide a random OFDM symbol followed by a constant OFDM symbol to indicate a 1 or a 0 and to provide another two consecutive OFDM symbols to indicate another of the 1 or the 0.

Examples of methods are described herein. An example method may include interfacing with an application on an electronic device to initiate transmission of a carrier wave, backscattering, by a first card, the carrier wave to provide a backscattered signal including data, and receiving, by a second card, the backscattered signal including the data.

In some examples, the carrier wave comprises a Bluetooth signal have a sequence of 0s or 1s as its payload.

In some examples, a method further includes placing the electronic device in proximity to the first card and the second card.

In some examples, backscattering comprises backscattering the carrier wave to provide the backscattered signal having only a single sideband.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, networking components, timing protocols, and software operations have not been shown in detail in order to avoid unnecessarily obscuring the described embodiments of the invention.

Examples described herein may provide backscatter devices and systems that may synthesize standard-compliant wireless transmissions (e.g. Wi-Fi and/or ZigBee) to communicate with standard compliant off the shelf devices such as Wi-Fi access points and/or ZigBee hubs. Sensors utilizing examples of the described backscatter technology may have orders of magnitude lower power consumption, which may drastically improve the battery life and/or reduce the size and cost of the battery on sensors.

Examples described herein include devices and systems utilizing backscatter communication to directly generate Wi-Fi transmissions (e.g. instead of sending an additional data stream by backscattering Wi-Fi signals) that can be decoded on any of the billions of existing devices with a Wi-Fi chipset.

Figure 1:
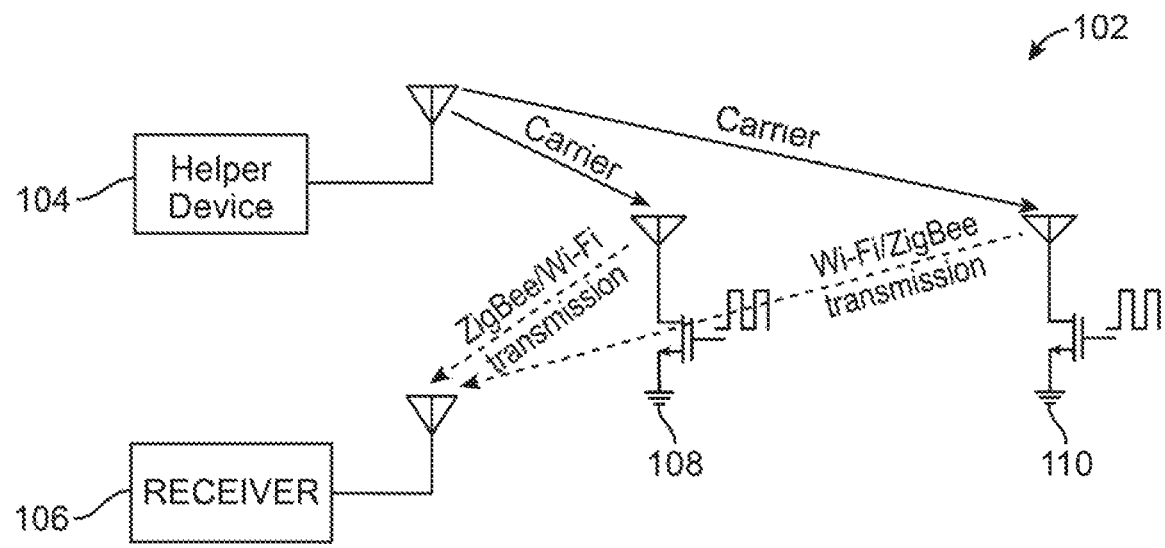
FIG. 1 is a schematic illustration of a system arranged in accordance with examples described herein.

FIG. 1 is a schematic illustration of a system arranged in accordance with examples described herein. The system 102 includes helper device 104, receiver 106, backscatter device 108, and backscatter device 110. During operation, the helper device 104 transmits a carrier signal. The backscatter device 108 and/or backscatter device 110 may backscatter the carrier signal into transmissions that may be compliant with a wireless communication protocol, such as Wi-Fi, ZigBee, and/or Bluetooth. The transmissions from the backscatter device 108 and/or backscatter device 110 may be received by the receiver 106. In this manner, the receiver 106 may be any electronic device that is capable of receiving a wireless communication signal (e.g. a wireless communication device) arranged in the protocol transmitted by the backscatter device 108 and/or backscatter device 110, e.g. Wi-Fi, ZigBee, and/or Bluetooth. Accordingly, backscatter devices may transmit to conventional electronic devices (e.g. wireless communication devices) using wireless communication protocols.

Wi-Fi signals generally refer to wireless local area network communication signals, typically using the 2.4 GHz and/or 5 GHz ISM radio bands. The communication signals may be sent in accordance with the Institute of Electrical and Electronics Engineers' 802.11 standards, such as but not limited to, 802.11a, 802.11b, 802.11g, and/or 802.11n.

The helper device 104 may be implemented using any electronic device capable of providing carrier signals (e.g. wireless communication device) described herein. Examples of helper devices include, but are not limited to, routers, mobile communications devices such as cell phones or tablets, computers, and/or laptops. The helper device 104 may generally have a wired power source, although in some examples the helper device 104 may be battery powered. Generally, the helper device 104 may have sufficient power to generate the carrier signal. A single helper device may provide a carrier signal to more than one backscatter device as described herein. Although a single helper device 104 is shown in FIG. 1, any number of helper devices may be used in some examples. In some examples, the helper device 104 may implement media access control protocols. The helper device 104, for example, may transmit the carrier signal once the desired channel (e.g. a channel on which the carrier signal and/or backscattered signal will be transmitted) is determined to be free.

The helper device 104 generally includes RF components, such as frequency synthesizer(s) and/or power amplifiers, which may then not be needed at the backscatter device 108 and/or backscatter device 110. In this manner the helper device 104 may provide the RF functions for any number of backscatter devices, such as backscatter device 108 and backscatter device 110.

The carrier signal provided by the helper device 104 may be any of a variety of wireless signals which may be backscattered by the backscatter device 108 and/or backscatter device 110 to form a wireless communication signal arranged in accordance with a wireless communication protocol, such as Wi-Fi, ZigBee, Bluetooth, and/or SigFox. The carrier signal may be a continuous wave or a protocol-specific carrier signal (e.g. a Bluetooth, Wi-Fi, ZigBee, and/or SigFox signal). In some examples, the carrier signal may be a spread spectrum signal. In some examples, the carrier signal may be a frequency hopped signal. In some examples, the carrier signal may be a continuous wave signal. In some examples, one or more characteristics of the continuous wave signal (e.g. the frequency, amplitude, and/or phase) may be selected in accordance with a particular wireless protocol and/or frequency and/or amplitude and/or phase that the receiver 106 is configured to receive. In some examples, the carrier signal may be a single-frequency tone signal.

In some examples, the carrier signal may be a data-free signal. For example, data decodable by the receiver may not be encoded in the carrier signal. In some examples, the carrier signal may be implemented using a predetermined data signal. For example, the carrier signal may not be encoded with data that is not predetermined and/or generated at the helper device 104. In some examples, the carrier signal may be a non-payload signal. For example, a data payload detectable by the receiver 106 may not be included in the carrier signal. In some examples, the carrier signal may be a signal based on media access control sublayer processing performed by the helper device 104.

The helper device may in some examples detect an unused portion of a spectrum and/or wireless communication channel. For example, the helper device may detect that a wireless communication channel, or portion thereof, is unused, and may selectively transmit a carrier signal on the wireless communication channel, or portion thereof, which is unused. In some examples, the carrier signal transmission may proceed only after the helper device determines that the wireless communication channel used by the carrier signal is unused. In some examples, additionally or instead, the helper device may detect that a wireless communication channel on which a backscatter signal is intended to be received, or portion thereof, is unused, and may selectively transmit a carrier signal when the receive channel is unused.

For example, traditional Wi-Fi communications share the network using carrier sense. However, carrier sense generally requires a Wi-Fi receiver that is ON before every transmission. Since traditional Wi-Fi receivers require power-consuming RF components such as ADCs, frequency synthesizers, and LNA, a requirement to conduct carrier sense at the backscatter device 108 and/or backscatter device 110 may reduce the overall power savings achieved from using backscatter techniques. Accordingly, in examples described herein, carrier sense may be performed by the helper device 104 and may not be performed by backscatter devices, such as the backscatter device 108 and/or backscatter device 110. Generally, the helper device 104 may perform carrier sense and signal a backscatter device, such as backscatter device 108 and/or backscatter device 110 when to transmit. The helper device 104 may also arbitrate the channel between multiple backscatter devices and address other link-layer issues including ACKs and retransmissions.

The backscatter device 108 and backscatter device 110 may be implemented using and/or together with any devices having backscatter communication capability, such as, but not limited to, tags, mobile communication devices such as cell phones or tablets, computers, and/or laptops. Other devices may be implemented having backscatter communication capability, including but not limited to sensors, wearable devices such as watches, eyeglasses, contact lenses, and/or medical implants. It is anticipated that the backscatter devices may have a sufficiently small form factor and low power requirement as to be able to be incorporated in or attached to any object and provide communication functionality for the object and/or associated with the object. In this manner, backscatter devices may be placed ubiquitously in an environment, and facilitate Internet of Things (IoT) and/or other ubiquitous sensor functionality. Although two backscatter devices are shown in FIG. 1, it is to be understood that any number of backscatter devices may be used, including one backscatter device. In other examples, 10, 20, 30, 40, 50, 60, 70, 80, 90, 100 or more backscatter devices may be present in the system 102.

Generally, backscatter devices, such as the backscatter device 108 and backscatter device 110 function to present varying impedance to a carrier signal such that, for example, the carrier signal is either reflected or absorbed by the backscatter device at any given time. In this manner, for example a '1' may be indicated by reflection, and a '0' by absorption, or vice versa, and the carrier signal may be backscattered into a data-carrying signal. Accordingly, in some examples, a data-carrying signal may be provided through backscatter using only the energy required to alter an impedance at a backscatter device's antenna. In this manner, the backscatter devices may transmit data-carrying signals at lower power than if the backscatter devices had themselves generated the carrier signals.

Backscatter devices described herein, such as backscatter device 108 and backscatter device 110 may generally be ultra-low power devices. For example, backscatter devices described herein may eliminate or reduce the need for power hungry communication components (e.g. RF signal generators, mixers, analog-to-digital converters, etc., which may be present in the helper device 104). In this manner, backscatter devices described herein may consume microwatts of power to transmit data, which may improve the battery life of the component (e.g. sensor) utilizing the communication capability of the backscatter device. Backscatter devices may perform digital baseband operations, such as coding and/or modulation.

The backscatter signal backscattered by the backscatter device 108 and/or backscatter device 110 may be a signal produced using subcarrier modulation performed by the backscatter device 108 and/or backscatter device 110. In some examples, the frequency of the backscattered signal may be frequency-shifted from that of the carrier signal. In some examples, data may be encoded in the backscattered signal using phase- and/or amplitude-shift keying. In some examples, the backscattered signal may be based on phase-shift keying (e.g. QPSK and/or BPSK) and/or amplitude-shift keying subcarrier modulation performed by the backscatter device 108 and/or backscatter device 110. Accordingly, backscatter devices described herein, including the backscatter device 108 and the backscatter device 110 may provide backscatter signals in accordance with wireless communication protocols that utilize phase- and/or amplitude-shift keying (e.g. Wi-Fi, ZigBee, SigFox). In some examples, the backscattered signal may include DSSS and/or CCK spreading sequences, which may be added by the backscatter device 108 and/or backscatter device 110. In some examples, the backscattered signal may include a payload, added to a signal generated by the helper device 104 after receipt of the carrier signal at the backscatter device 108 and/or backscatter device 110. In some examples, the backscattered signal may include a packet, decodable at the receiver 106 based on a particular protocol or standard implemented by the receiver 106. In some examples, the backscattered signal may include data detected at the backscatter device 108 and/or backscatter device 110 and added to a predetermined, frequency-specific carrier signal.

Backscatter devices and/or helper devices described herein, such as backscatter device 108, backscatter device 110, and/or helper device 104, may each include multiple antennas. In this manner, antenna diversity may be leveraged and multiple-input-multiple-output (MIMO) techniques may be used. For example, the helper device 104 may distribute the carrier signal across multiple antennas based on the wireless channel, which may improve wireless signal propagation from the helper device 104 to the backscatter device 108 and/or 110 to the receiver 106.

The receiver 106 may be implemented using any electronic device capable of receiving wireless communication signals (e.g. wireless communication device) formatted in the protocol provided by the backscatter devices backscatter device 108 and/or backscatter device 110, such as Wi-Fi and/or ZigBee. Generally, any electronic device (e.g. wireless communication device) may be used to implement receiver 106 including, but not limited to, Wi-Fi access points, Wi-Fi routers, ZigBee hubs, routers, mobile communications devices such as cell phones or tablets, computers, and/or laptops. In some examples, the helper device 104, receiver 106, and backscatter device 108 and/or backscatter device 110 may be physically separate devices.

While shown as a separate device from the helper device 104, in some examples the helper device 104 and receiver 106 may be integrated and/or may be the same device. For example, an electronic device may include multiple antennas in some example. One or more antennas in some examples may provide the carrier signal (e.g. provide the helper device 104) while one or more antennas, different from those providing the carrier signal in some examples, may receive the signal transmitted by one or more backscatter devices (e.g. provide the receiver 106). In some examples, the helper device and the receiver may be integrated into a single device. Cancellation circuitry may be provided in the integrated device to suppress (e.g. cancel) the carrier signal transmitted by the helper device at the receiver.

The receiver 106 may receive transmission from the backscatter device 108 and/or backscatter device 110 in the presence of interference from the carrier signal transmitted by the helper device 104. In some examples, specialized hardware may be used by the receiver 106 (e.g. a full-duplex radio) to cancel this interfering signal, however that may not be compatible with existing Wi-Fi devices. In some examples, the helper device 104 may provide a carrier signal that is made up of frequencies (e.g. a single-frequency tone or a multi-frequency signal) outside a desired frequency channel for the transmissions of the backscatter device 108 and/or backscatter device 110. This may ensure and/or aid in the receiver 106 suppressing the out-of-band interference from the helper device 104. For example, Wi-Fi receivers may increasingly be required to work even in the presence of interference in an adjacent band, such as interference that is 35 dB stronger. Accordingly, if the helper device 104 transmitted a carrier signal in the adjacent band, a traditional Wi-Fi receiver may be used to implement receiver 106 and would maintain function in the presence of the interfering signal. Further, as Wi-Fi and Bluetooth radios are being integrated onto single chipsets, Wi-Fi hardware is being designed to work in the presence of out-of-band Bluetooth interference. Accordingly, in some examples, the helper device 104 may provide a Bluetooth carrier signal and a Wi-Fi chipset in the receiver 106 may operate appropriately to receive Wi-Fi transmissions from the backscatter device 108 and/or backscatter device 110 even in the presence of the interfering Bluetooth signal.

In some examples, some physical separation is provided between helper device 104 and receiver 106. For example, excessive out-of-band interference may occur if the receiver 106 is too close to the helper device 104 such that the transmission of the carrier signal by the helper device 104 saturates and/or compresses the RF front end of the receiver 106, degrading Wi-Fi performance. This is generally referred to as the input 1 dB compression point, which may be around 0 dBm for commercial Wi-Fi devices.

The helper device 104 and receiver 106 described herein may change functionality from time to time in some examples. For example, while the helper device 104 at may function as described with reference to a helper device, the helper device 104 may at times function as a receiver in some examples, while the receiver 106 may function as a helper device at times. For example, a router (e.g. a Wi-Fi router) may be used having multiple modes of operation. In one mode of operation, the router may be used to implement the helper device 104, while in another mode, the router may be used to implement the receiver 106. The same device can time multiplex its functionality in some examples, such that the helper device 104 may be integrated and/or incorporated with the receiver 106.

In some examples, multiple helper devices and/or receivers may be present in a system. In some examples, a single device (e.g. a router) may serve as a helper device at certain times and as a receiver at other times. In some examples, multiple (e.g. two) devices may be present in a system, each able to serve as either a helper device or a receiver. For example, the device may function as a helper device (e.g. be configured to transmit a carrier signal) in one mode, and a receiver (e.g. be configured to receive a backscattered signal) in a second mode. Accordingly, the two devices may trade off serving as the helper device at any instance of time. For example, at one time Router 1 may function as the helper device whereas Router 2 may function as the receiver and at another time instant the roles may be reversed. Different time allocations may be used in some examples and a larger number of routers may be present in some examples.

In examples having multiple helper devices and/or receivers, the helper devices and/or receivers may be positioned across an area to maximize and/or improve spatial coverage by the carrier signal and/or spatial coverage for receipt of backscattered signals. In some examples, a helper device of the plurality of helper devices in a system may be selected to act as a helper device (in some examples, the selection may be specific to a specific backscatter device or group of backscatter devices) based on proximity of the candidate helper device to the backscatter device. In some examples, the selection may be made based on a candidate helper device of the plurality of helper devices having a better reception of a backscattered signal than another of the plurality of helper devices.

Figure 2:
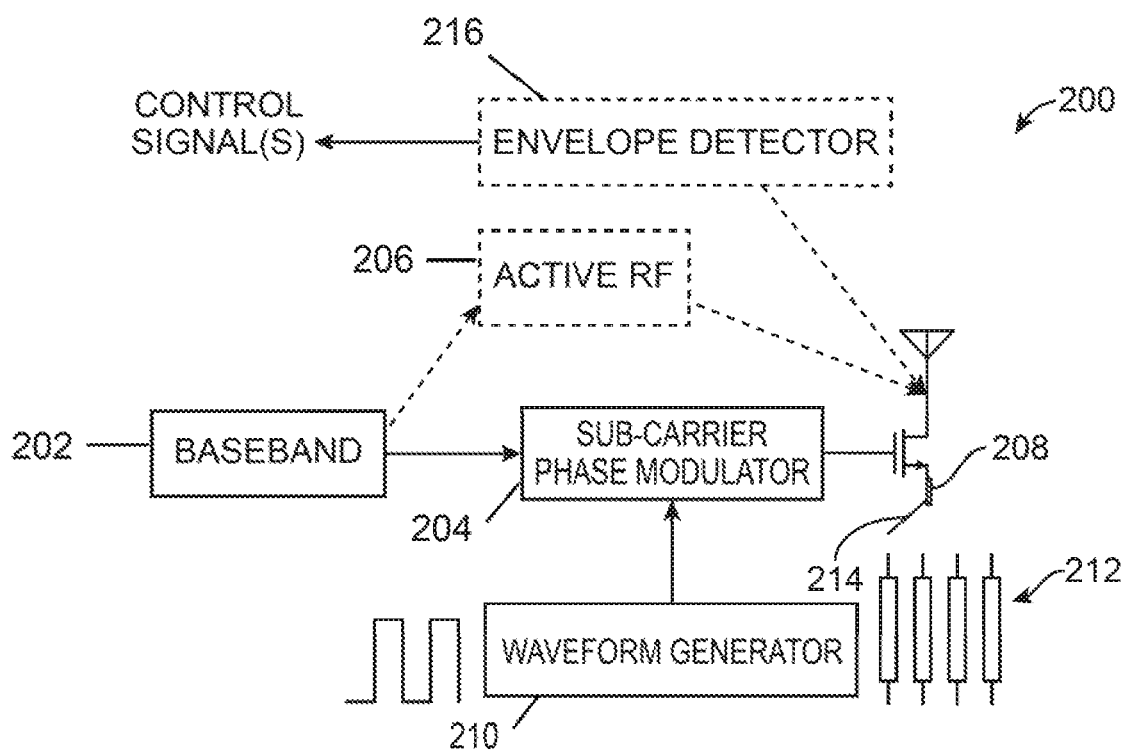
FIG. 2 is a schematic illustration of a backscatter device arranged in accordance with examples described herein.

FIG. 2 is a schematic illustration of a backscatter device arranged in accordance with examples described herein. The backscatter device 200 may be used to implement, for example, the backscatter device 108 and/or backscatter device 110 of FIG. 1. The backscatter device 200 includes baseband 202, sub-carrier phase modulator 204, active RF 206, switch 208, and waveform generator 210.

Backscatter devices generally operate by changing antenna impedance. The effect of changing the antenna impedance can be understood to cause the radar cross-section, e.g., the signal reflected by the antenna, also to change between the two different states. Given an incident signal with power $P_{incident}$, the power in the backscattered signal may be expressed as $$P_{backscatter} = P_{incident} \frac{|\Gamma_1^* - \Gamma_2^*|^2}{4} \quad \text{Equation 1}$$

where $\Gamma_1^*$ and $\Gamma_2^*$ are the complex conjugates of the reflection coefficients corresponding to two impedance states. To maximize the power in the backscattered signal, the difference in the power of the two impedance states which is generally maximized, as given by $$|\Gamma|^2 = \frac{|\Gamma_1^* - \Gamma_2^*|^2}{4} \quad \text{Equation 2}$$

To have the power in the backscattered signal equal to that of the incident signal, the left had side of equation 2 may be set to 4, which can be achieved by modulating the reflection coefficients between +1 and −1. In practice, however, backscatter hardware may deviate from this ideal behavior and incurs losses, which are acceptable in practice; one example hardware implementation had a loss of around 1.1 dB.

By utilizing a switch (e.g. switch 208), the antenna impedance may toggle between two impedance states. Examples of backscatter device 200 may generate transmissions (e.g. Wi-Fi transmissions) using this binary system. For example, the switch 208 may be connected to ground. However, in some examples, additional impedance states may be used. For example, four impedances 212 are shown in FIG. 2 which may be connected to the switch 208 and/or another switch 214 which may couple the impedances 212 to the transistor used to implement the switch 208. In this manner, any number of impedances may be presented to the antenna of the backscatter device. Examples described herein may utilize a variety of impedances (e.g. more than two) to provide single sideband backscatter.

Generally, the backscatter device 200 may shift a frequency of a carrier signal by the backscatter device 200. For example, the frequency may be shifted from a single-frequency tone provided outside a desired Wi-Fi transmission channel to a frequency within the desired Wi-Fi transmission channel (e.g. the center frequency of the desired Wi-Fi transmission channel). The frequency-shifted signal may be used to provide wireless communication signal (e.g. Wi-Fi signals). Generally, to shift the frequency of the carrier signal, the switch 208 may be operated at a frequency $\Delta f$ equal to an amount of desired frequency shift. Digital encoding may be performed using digital logic and phase changes may be implemented in some examples by modifying a phase of a square wave (e.g. used to approximate a sine wave). In this manner, the digital backscatter device 20 may synthesize wireless communication signals (e.g. Wi-Fi signals) while operating in the digital domain at baseband.

For example, the backscatter device 200 may backscatter a single-frequency tone signal, e.g. provided by the helper device 104 of FIG. 1. The single-frequency tone signal may be written as $\sin 2\pi(f_{wifi} - \Delta f)t$, where $f_{wifi}$ is the desired frequency of Wi-Fi transmission by the backscatter device, and $\Delta f$ is the frequency of a waveform utilized by the backscatter device. The backscatter device 200 may utilize a square wave at a frequency $\Delta f$ (e.g. provided by the waveform generator 210) to shift the tone to $f_{wifi}$. The square wave provided by the waveform generator 210 can be approximated as $$\frac{4}{\pi}\sin 2\pi \Delta ft \quad \text{Equation 3}$$

Since modulating the radar cross section of an antenna effectively multiplies the incoming signal by the modulated signal, the backscatter signal can be approximated as sin $2\pi(f_{wifi}-\Delta f)t$ sin $2\pi \Delta ft$. In this manner, backscatter has created two tones, one at $f_{wifi}$ and one at $f_{wifi}-2\Delta f$ from the initial single-tone signal.

Accordingly, backscatter devices described herein, including the backscatter device 200 of FIG. 2, may provide backscatter signals having a frequency that is shifted from the frequency of a carrier signal by a difference frequency. The difference frequency may be a frequency of (or included in) a waveform provided to the subcarrier modulation circuitry.

Some examples of backscatter devices may provide backscatter signals shifted from the frequency of a carrier signal by a difference frequency and may avoid generating both sidebands of the backscatter signal (e.g. backscatter devices may provide a backscatter signal at a carrier signal frequency+the difference frequency while avoiding providing a backscatter signal at the carrier signal frequency−the difference frequency, e.g. the backscatter signal may be provided in only a single sideband.)

Recall, as described above, backscatter may create two tones. This may be undesirable in some examples. For example, when used with Bluetooth, both the advertising channels 37 and 39 are at either end of the ISM band. Thus, creating any frequency shifts to the corresponding Bluetooth signal may create a mirror copy outside the ISM band. The third advertising channel, 39, overlaps with Wi-Fi channel 6 and is close to Wi-Fi channel 1 and hence may create strong interference to the weak backscattered Wi-Fi signals. Further, generating packets on Wi-Fi channel 11 using advertising channel 39, may again create a mirror copy that lies outside the ISM band. Thus, existing sideband modulation techniques may not be advantageous for achieving interscatter on any of the Wi-Fi channels.

Examples described herein may provide for single sideband backscatter. Backscatter devices may produce a frequency shift on only one side of the single tone carrier (e.g. Bluetooth) transmission. The approach may be explained by considering radio operation. Generally, a radio may use oscillators at a radio frequency, e.g. 2.4 GHz, to generate the orthogonal signals, cos $2\pi ft$ and sin $2\pi ft$. These are multiplied with digital in-phase, I(t) and quadrature phase components, Q(t) to create I(t)cos $2\pi ft$+jQ(t)sin $2\pi ft$. By setting I(t) and Q(t) to cos $2\pi\Delta ft$ and sin $2\pi\Delta ft$, radios can easily create the desired shifted signal, $e^{j2\pi(f+\Delta f)t}$, without any mirror copies. Examples described herein, however, may not advantageously utilize oscillators running at a radio frequency. e.g. 2.4 GHz, since they would consume significant power.

Instead, mathematically the above operations may be imitated using complex impedances on the backscatter device without high frequency (e.g. 2.4 GHz) oscillators. For example, the complex signal, $e^{j2\pi\Delta ft}$ may be provided (e.g. by waveform generator 210). Backscattering such a complex signal with the incoming carrier signal (e.g. singletone Bluetooth transmission), cos $2\pi\Delta ft$, results in, $$e^{j2\pi\Delta ft}\cos 2\pi ft = \tfrac{1}{2}(e^{j2\pi(f+\Delta f)t}-e^{j2\pi(-f-\Delta f)t}) \quad \text{Equation 4}$$

The first term is the desired shifted signal while the second term has a negative frequency and does not occur in practice. Thus, the above operation creates the desired shift without a mirror copy. Accordingly, examples of backscatter devices described herein may provide the complex signal $e^{j2\pi\Delta ft}$ a using backscatter, thereby achieving single-sideband backscatter modulation. This signal can be written as, $$e^{j2\pi\Delta ft}=\cos 2\pi\Delta ft+j\sin 2\pi\Delta ft \quad \text{Equation 5}$$

To create this on a backscatter device, the sin/cos terms may be generated using square waves. Complex impedances at the switch (e.g. switch 208) may be used to generate the complex values.

Accordingly, the sin/cos terms in Equation 5 may be generated using a square wave going between the two values, +1 to −1, at a frequency of $\Delta f$. Fourier analysis provides that a square wave at $\Delta f$ may be represented as $$\frac{4}{\pi}\sum_{n=1,3,5,\ldots}\frac{1}{n}\sin(2\pi n\Delta ft) \quad \text{Equation 6}$$

The first harmonic is the desired sine term while the third and fifth harmonic have a power of $1/n^2$ which are 9.5 dB and 14 dB, respectively, lower than the first. Since all 802.11b bit rates may operate at SNRs lower than 14 dB, such an approximation is sufficient for examples described herein. To generate the cosine term, backscatter devices described herein may time shift a square wave by a quarter of the time period. This square wave may be generated by clocking the switch (e.g. switch 208) and the digital operations of the backscatter device at multiples of the desired difference frequency $\Delta f$.

Now that the sin/cos terms are approximated to be either +1 or −1, Eq. 5 can take one of four values: 1+j, 1−j, −1+j, and −1−j. These complex values may be created by changing the impedance of the backscatter hardware (e.g. utilizing the impedances 212). Generally, RF signals are reflected when they cross two materials that have different impedances. Since the impedance of an antenna is different from the medium around it, a fraction of the incident RF signals get reflected off the antenna. Backscatter generally operates by creating an additional impedance boundary between the antenna and the backscatter circuit. For example, given an incoming signal Sin, the reflected signal from the backscatter device may be given by, $$S_{Out}=\frac{Z_a-Z_c}{Z_a+Z_c}S_{In} \quad \text{Equation 7}$$

Where Za and Zc are the impedance of the antenna and the backscatter circuit (e.g. the switch 208 and impedances 212) respectively. In some examples of backscatter (e.g. when the switch 208 is tied to ground, without impedances 212), the impedance of the backscatter circuit may be set to either Za or 0 corresponding to no reflections or reflections of the incoming signal. In other examples, the impedance of the backscatter circuit can be set to complex values by changing the inductance of the circuit. For example, at the frequency f, the impedance of the backscatter circuit may be written as $j2\pi fL$ where the inductance is L. Thus, by changing the inductance, complex values may be provided for the fraction in equation 7 above.

To provide the four desired complex values 1+j, 1−j, −1+j, and −1−j, the impedances 212 may be set as $$\frac{-j}{2+j}Z_a, \frac{j}{2-j}Z_a, \frac{2-j}{j}Z_a \text{ and } \frac{2+j}{-j}Z_a$$

respectively. $Z_a$, the antenna impedance, may be 50 Ohms in some examples. Switching between the four impedance states (e.g. impedances 212) may allow the backscatter device to provide the complex signal $e^{j2\pi\Delta ft}$ and achieve single sideband operation.

Accordingly, in examples described herein, the switch 214 or other switching elements may switch between a number of impedance elements, such as the four impedance elements shown in impedances 212. The switch 214 or other switching elements may be controlled by the baseband 202, sub-carrier phase modulator 204, and/or waveform generator 210 of FIG. 2 in some examples.

By way of summary, to achieve single sideband operation, the waveform generator 210 may provide a square wave and a square wave shifted by a quarter period. These may represent the sine and cosine terms of Equation 5. Impedances 212 may include four impedance elements sufficient to cause the impedance of the backscatter circuit (e.g. backscatter device) to be—

$$\frac{-j}{2+j}Z_a, \frac{j}{2-j}Z_a, \frac{2-j}{j}Z_a \text{ and } \frac{2+j}{-j}Z_a$$

at various times. Switching between these values allows the backscatter device to backscatter a signal into a third frequency without also generating the mirror image sideband at another frequency. For example, the backscatter signal may be provided at a frequency equal to a carrier frequency plus a difference frequency without also providing a backscatter signal at a frequency equal to the carrier frequency minus a difference frequency. In some examples, the backscatter signal may be provided at a frequency equal to a carrier frequency minus a difference frequency without also providing a backscatter signal at a frequency equal to the carrier frequency plus the difference frequency.

Data may be transmitted in backscatter signals in a number of ways. In some examples, reflection and/or absorption of the carrier signal itself may be utilized to encode data. For example, a carrier wave may be implemented using a signal having packets or other data (e.g. a Wi-Fi signal). The backscatter device may transmit and/or reflect packets of the carrier signal to indicate a '1' or '0' (or vice-versa). In some examples, phase- and/or amplitude-shift keying may be performed by the backscatter device to encode data in the backscatter signals. For example, following creation of a tone centered at the Wi-Fi channel ($f_{wifi}$), 802.11b transmissions using backscatter may be generated. 802.11b uses DSSS and CCK encoding which are both digital operations and hence can be performed using digital logic at the passive Wi-Fi device (e.g. by baseband 202). The backscatter device 200 may generate signals in accordance with a phase-shift keying protocol (e.g. QPSK, BPSK, DBPSK and/or DQPSK) using a square wave created at a frequency Δf, which may be understood by noting that DBPSK and DQPSK use a sine wave with four distinct phases: 0, π/2, π, and 3π/2. Since the square wave provided by switch 208 can be approximated as a sine wave, the four phases may be provided by changing the timing of the square wave provided by the waveform generator 210. For example, shifting the square wave by half of a symbol time effectively creates a phase change of π. phase changes of π/2 and 3π/2 can be achieved by shifting the square wave by one-fourth and three-fourth of a symbol time. In this manner, backscatter devices, such as backscatter device 200 may fully operate in the digital domain while run at a baseband frequency of a few tens of MHz and synthesize 802.11b transmissions using backscatter.

During operation, the baseband 202 may provide data for communication to the sub-carrier phase modulator 204, which may also be referred to as a sub-carrier modulator. It is to be understood that even when referred to as a sub-carrier phase modulator, phase modulation may not be performed in all examples. The waveform generator 210 may provide a waveform to the sub-carrier phase modulator 204. A frequency of the waveform may be selected as a difference between a frequency of the carrier signal and a desired frequency of the backscatter signal (e.g. frequency at which a receiver may receive the backscatter signal). The data may be provided in the backscatter signal in several ways. In some examples, the sub-carrier phase modulator 204 may control the switch 208 to reflect and/or absorb portions of the carrier signal (e.g. packets) in accordance with the data. For example, packets of the carrier signal may be reflected to indicate a '0' and absorbed to indicate a '1', or vice versa. In some examples, the sub-carrier phase modulator 204 may alter a phase, amplitude, or both of the waveform provided by the waveform generator 210 to provide an output signal. The output signal may be used to control a switch 208 to backscatter a carrier signal into a data-carrying signal formatted in accordance with a wireless communication protocol utilizing phase-shift keying, a wireless communication protocol using amplitude-shift keying, or combinations thereof.

In some examples, backscatter devices provide backscatter signals which are Wi-Fi signals (e.g. IEEE 802.11b signals). The backscatter devices may provide a backscattered signal which is formatted in accordance with a Wi-Fi protocol (e.g. IEEE 802.11b). In this manner, the backscattered signal may be received and decoded by any Wi-Fi capable device in some examples. While 802.11b signals are described by way of example, it is to be understood that in other examples, the backscatter devices may provide Bluetooth, ZigBee, or other wireless communication signals. Generally, a Wi-Fi signal may be written as $(I_{wifi}(t)+Q_{wifi}(t))e^{j2\pi f_{wifi}t}$ where $I_{wifi}(t)$ and $Q_{wifi}(t)$ correspond with the in-phase and quadrature-phase components of the baseband Wi-Fi signal, respectively.

In examples described herein involving a Bluetooth frequency and a Δf shift between a Bluetooth frequency and a Wi-Fi frequency, the Wi-Fi signal may be written as $$(I_{wifi}(t) + Q_{wifi}(t))e^{j2\pi\Delta ft}e^{j2\pi f_{bluetooth}t} \qquad \text{Equation 8}$$

Accordingly, to generate Wi-Fi signals, backscatter devices described herein may create $(I_{wifi}(t)+Q_{wifi}(t))e^{j2\pi\Delta ft}$ using backscatter. Examples of generation of $e^{j2\pi\Delta ft}$ are described herein (e.g. using switching between multiple impedances of the backscatter device). That signal may be multiplied by the in-phase and quadrature-phase components of 802.11b to generate Wi-Fi signals. Generally, IEEE 802.11b signals utilize DSSS/CCK coding that creates coded bits which are then modulated using either DBPSK or DQPSK. Accordingly, backscatter devices which transmit DBPSK and/or DQPSK may transmit Wi-Fi backscatter signals (e.g. IEEE 802.11b signals).

In examples of backscatter devices implementing DBPSK, the one and zero bits may be represented as +1 and −1, which may generally be considered setting $Q_{wifi}(t)$ to zero and $I_{wifi}(t)$ to either +1 or −1. Since $e^{j2\pi\Delta ft}$ takes the values in the set {1+j, 1−j, −1+j, −1−j}, multiplying it with +1 or −1 resulting in values within the same set, which we can be generated by backscatter devices described herein utilizing multiple impedance values for the backscatter device. Thus, DBPSK modulation may be provided by backscatter devices described herein, which may therefore achieve 1 and 5.5 Mbps IEEE 802.11b transmissions.

In examples of backscatter devices implementing DQPSK, both $I_{wifi}(t)$ and $Q_{wifi}(t)$ may be set to either +1 or −1. Thus, the baseband Wi-Fi signal can take one of the following values: {1+j, 1−j, −1+j, −1−j}. Multiplying this with $e^{j2\pi\Delta ft}$ which takes one of the following values {1+j, 1−j, −1+j, −1−j}, results in one of these four normalized values: {1, −1, j, −j}. Note that {1, −1, j, −j} and {1+j, 1−j, −1+j, −1−j} (which are four impedance values which may be generated by backscatter devices described herein) are constellation points that are shifted by π/4. Since 802.11b uses differential QPSK, the constant phase shift of π/4 may be ignored and instead the four complex impedance values provided by backscatter devices described herein may be used. Wi-Fi receivers may ignore the constant phase shift since the bits are encoded using differential phase modulation. In this manner, DQPSK modulation may be provided by example backscatter devices described herein, which may therefore achieve 2 and 11 Mbps 802.11b transmissions.

Some example backscatter devices may additionally include active RF 206 components such that in one mode, the backscatter device 200 may backscatter signals and have low power (e.g. backscatter) operation, while in another mode the backscatter device 200 may utilize active RF 206 to transmit wireless communication signals conventionally (e.g. generating the device's own carrier signal). The backscatter components and active RF 206 may utilize a same antenna, as shown in FIG. 2, and the antenna connection may be switched between the active RF 206 and sub-carrier phase modulator 204 in some examples by control circuitry (not shown in FIG. 2). In other examples, the active RF 206 and sub-carrier phase modulator 204 may utilize different antennas.

The antenna may be connected to a switch which selects between the active RF 206 radio and the sub-carrier phase modulator 204. The selection may be made, for example, on a basis of proximity to a helper device. In some examples, when the backscatter device is in the range of a helper device it may couple the sub-carrier phase modulator 204 to the antenna to perform low power transmissions (e.g. Wi-Fi transmissions). However, when the backscatter device is outside the range of the helper device, the antenna may be coupled to active RF 206.

Baseband 202 may be implemented using typical baseband circuitry for the wireless communication protocol of interest. e.g. Wi-Fi baseband circuitry and/or ZigBee baseband circuitry. Generally, the baseband 202 includes digital circuitry components which may be relatively low power. The baseband 202 may provide encoding in accordance with the wireless communication protocol of interest (e.g. DSSS and CCK encoding for 802.11b transmissions). The data provided by the baseband 202 may originate from one or more sensors which may be coupled to and/or integrated with the backscatter device 200 in some examples. Any number of sensors may be used, including but not limited to, temperature sensors, vibration sensors, humidity sensors, glucose sensors, pH sensors, blood oxygenation sensors, GPS sensors, optical sensors, cameras, and/or microphones. In this manner, sensor data may be provided that may be transmitted by the backscatter device 200.

In some examples, the backscatter device 200 may implement WPA/WPA2 and ensure that its Wi-Fi transmissions comply with the Wi-Fi security specifications. Since these are digital operations, the baseband 202 may implement them on the backscatter device 200 using baseband processing.

Although not shown in FIG. 2, the backscatter device 200 may include a power source, such as a battery and/or energy harvesting system. The battery may be implemented using a lithium ion battery. In some examples additionally or instead, energy harvesting components may be provided to power the backscatter device 200, including, but not limited to, components for harvesting solar energy, thermal energy, vibrational energy, or combinations thereof. The power source may power the baseband 202, sub-carrier phase modulator 204, and waveform generator 210. In some examples, the active RF 206 may be used when a larger power source than the power source used to power those backscatter components is available (e.g. a wired power source).

The sub-carrier phase modulator 204 may be implemented using circuitry that may adjust a phase, amplitude, or both of a waveform. In some examples, an FPGA may be used to implement sub-carrier phase modulator 204. The sub-carrier phase modulator 204 is connected to the baseband 202 and may receive data from the baseband 202. The sub-carrier phase modulator 204 may be further connected to the waveform generator 210 and may receive a waveform provided by the waveform generator 210. The sub-carrier phase modulator 204 may alter a phase, amplitude, or both, of the waveform in accordance with the data from the baseband 202 to provide an output signal. The sub-carrier phase modulator 204 may be coupled to the switch 208 and may provide the output signal to the switch 208.

Note that, on the physical layer, ZigBee uses offset QPSK and direct sequence spread spectrum (DSSS) in the 2.4 GHz ISM band. Wi-Fi is generally implemented using BPSK/QPSK modulation with DSSS/CCK spreading sequences. To create phase changes used for the DBPSK/DQPSK modulation, the sub-carrier phase modulator 204 may alter a phase of a square wave provided by waveform generator 210 by changing the timing of the wave. The sub-carrier phase modulator 204 may utilize QPSK modulation in other examples to synthesize a Wi-Fi and/or ZigBee packet. In some examples, a payload of the packet may include the spreading sequence for the carrier signal. For example, the spreading sequence may be provided by the baseband 202 and/or may be stored in a memory on the backscatter device 200.

In some examples, an analog based technique may be used to implement phase shift keying. Instead of choosing the phase of the waveform provided by waveform generator 210 based on the data provided by baseband 202, in some examples, phase shift keying may be implemented, for example by replacing the switch 208 with a multiplexer or switching network and switching the antenna impedance between four impedance states (e.g. which may all be placed 900 apart in phase on a circle) to implement phase shift keying. Amplitude shift keying may be implemented in an analogous manner.

Switch 208 may be implemented using generally any circuitry for altering impedance presented to an antenna, such as a transistor. The switch 208 is coupled between the sub-carrier phase modulator 204 and an antenna of the backscatter device 200. In the example of FIG. 2, the switch 208 is implemented using a transistor. Any of a variety of antenna designs may be used. The antenna may be operational in the frequency of the carrier signal and the frequency of the backscatter signal. A high output signal provided by the sub-carrier phase modulator 204 to the gate of the switch 208 accordingly may turn the transistor on, presenting a low impedance to the antenna. A low output signal provided by the sub-carrier phase modulator 204 to the gate of the switch 208 accordingly may turn the transistor off, presenting a high impedance to the antenna. The switch 208 may generally run at a baseband frequency—e.g. a much lower frequency than a frequency of a carrier signal provided to the backscatter device 200. In some examples, the switch 208 may be operated at a frequency of 50 MHz or lower, although other frequencies may also be used in other examples.

Switch 214 may be implemented using generally any circuitry for altering impedance presented to an antenna, such as a transistor. In some examples, the switch 214 may be integrated with the switch 208. The switch 214 may allow for different impedances to be coupled to the antenna of the backscatter device, such as the impedance elements 212. In the example of FIG. 2, the impedance elements 212 may be provided in parallel and the switch 214 may couple a selected one of the impedance elements 212 to the antenna. In other examples, the impedance elements 212 may be provided in parallel, and one or more switches may be provided to add and/or remove impedance elements from being coupled to the antenna. The impedance elements 212 may generally be implemented using any components having an impedance including, but not limited to, one or more resistors or inductors.

Waveform generator 210 may provide a waveform to the sub-carrier phase modulator 204. Any periodic waveform may generally be used including, but not limited to, a square wave, sine wave, cosine wave, triangle wave, sawtooth wave, analog signal, multi-level signal, or combinations thereof. The waveform generator 210 may be implemented using, hardware, software, or combinations thereof. For example, the waveform generator 210 may be implemented using an oscillator. The phase of a waveform provided by the waveform generator 210 having an oscillator may be altered, for example, by changing a phase of a clock signal provided to the oscillator. In some examples, the waveform generator 210 may be implemented using an FPGA, DSP, and/or microprocessor and executable instructions to provide the desired waveform at the desired frequency.

Generally, the carrier signal may have a particular frequency—e.g. a single tone, a frequency used in Bluetooth, Wi-Fi, ZigBee, and/or other wireless communication protocol. It may be desirable for the backscatter device 200 to transmit a backscattered signal at a particular frequency (e.g. at a frequency used in Bluetooth, Wi-Fi, ZigBee, or other wireless communication protocol). It may be desirable for the backscattered signal to occur at a different frequency than the carrier signal, for example to avoid or reduce interference between the carrier signal and the backscattered signal.

The waveform generator 210 may provide a waveform at a frequency which may be selected to be a frequency equal to a difference between a frequency of the carrier signal and a desired frequency for transmission of a backscattered signal. The sub-carrier phase modulator 204 may control the switch 208 at the frequency of the waveform provided by the waveform generator 210 which may effectively mix the frequency of the carrier signal with the frequency of the waveform, resulting in a backscattered signal at a frequency of the carrier signal+/−the frequency of the waveform. As described herein, in some examples, the waveform generator 210 may provide two square waves—one shifted one quarter phase relative to the other and the backscatter device may switch between multiple (e.g. four) impedances such that a backscatter signal is generated in a single sideband. Generally, a backscattered signal at a desired frequency may be achieved by providing a waveform to the sub-carrier phase modulator 204 having a frequency equal to a difference between the frequency of the carrier signal and the desired frequency of backscatter transmission.

In some examples, the carrier signal may be a frequency hopped signal. The waveform generator 210 may provide a waveform having a frequency that hops in accordance with the hopping of the frequency hopping signal used to implement the carrier signal such that the frequency hopping carrier signal may be backscattered by the backscatter device 200. For example, the carrier signal may be a frequency hopped signal which has a sequence of frequencies over time. The receive frequency may generally be fixed. Accordingly, the waveform generator 210 may provide a waveform having a sequence of frequencies such that the data is transmitted at the constant receive frequency over time, despite the hopping frequency of the carrier signal.

A variety of techniques may be used to select the sequence of frequencies for the waveform. In some examples, the sequence of frequencies of the frequency-hopped carrier signal may be received by the backscatter device over a downlink from the helper device used to transmit the carrier signal. In some examples, the sequence of frequencies may be known (e.g. a pseudorandom sequence). The backscatter device may include a memory that may store the sequence of frequencies of the frequency-hopped carrier signal and/or the sequence of frequencies used for the waveform, or indications thereof.

In some examples, backscatter devices described herein may include frequency determination circuitry coupled to an antenna for sensing the carrier signal (e.g. the antenna used to backscatter may be used). The frequency determination circuitry may sense the frequency of the carrier signal and compute a difference between the frequency of the carrier signal and the desired frequency of backscatter signal and provide an indication of the difference (e.g. to be used as the waveform frequency) to the waveform generator such that the waveform generator may provide the waveform at the indicated difference frequency.

In some examples, the carrier signal may be a spread spectrum signal, such as a direct spread spectrum (DSS) signal. Generally, direct spread spectrum refers to techniques where energy may be spread across multiple frequencies (e.g. a frequency band) by coding data in a particular manner using a code or coding sequence. Coding sequences may be pseudorandom sequences, and examples include m-sequences, barker codes, gold codes, and Hadamard Walsh codes.

In some examples, a time at which backscattering begins may need to be synchronized to the spread spectrum carrier signal. For example, data may be provided in a backscattered signal in some examples by altering the carrier signal. In examples where the carrier signal comprises a spread spectrum signal, the backscatter device may begin backscattering when a particular portion of the carrier signal is presented to the backscatter device (e.g. the backscatter device may synchronize backscattering of data with data in the carrier signal). In some examples, the sub-carrier phase modulator of a backscatter device may begin backscatter at a time based on features of the carrier signal. Features may include data present in the carrier signal at a particular time and/or a location within an overall spreading sequence at a particular time.

In some examples, the sub-carrier phase modulator may begin backscatter responsive to a synchronization signal from another device. For example, a master synchronization may be provided where a device (e.g. the helper device) may provide a signal to the backscatter device to indicate a time to begin backscatter relative to the spread spectrum carrier signal.

Data may be provided in the backscatter signal in several ways. In some examples, such as in some examples where the carrier signal includes packets or other data (e.g. a Wi-Fi, ZigBee, and/or SigFox signal), data may be provided in the backscatter signal by reflecting and/or absorbing portions (e.g. packets) of the carrier signal in accordance with the data to be transmitted. A receiver may decode the presence of a packet in the backscatter signal as a '1' (or a '0' in some examples) and the absence of a packet in the backscatter signal as a '0' (or a '1' in some examples). In some examples, the backscatter device may encode data in the packet sequence number transmitted by the helper device.

In some examples, data may be provided in the backscatter signal by altering a phase, amplitude, or combinations thereof, of the waveform provided to the sub-carrier modulation circuitry in accordance with the data to perform phase-shift keying and/or amplitude-shift keying. In this manner, the backscatter device 200 may create wireless communication transmissions (e.g. which may be arranged in accordance with a standard wireless communication protocol, such as but not limited to Wi-Fi 802.11a, 802.11b, 802.11g, 802.11n, ZigBee, and/or Bluetooth). Since the backscatter device 200 has no (or fewer) analog components, it may generally consume less silicon area and be smaller and cheaper than existing transmission devices, such as Wi-Fi chipsets. Further, its power consumption may be significantly lower as it may only have a need to perform digital baseband operations.

The backscatter device 200 may further include a receiver for receiving signaling message from, e.g. the helper device 104. In examples described herein, the helper device 104 may provide signaling packets which may, for example, be created using amplitude modulation such as ON/OFF keying. The backscatter device 200 may include a passive energy detector (e.g. envelope detector 216) with analog components and a comparator to distinguish between the presence and absence of energy. In this manner, signaling packets may be received while consuming low power, 18 mW in some examples.

In some examples, the carrier signal may be a single tone signal. In some examples, a helper device such as the helper device 104 of FIG. 1 may be implemented using a Bluetooth capable electronic device, and the carrier signal may be provided from a Bluetooth signal. In this manner, examples described herein may transform transmissions from Bluetooth devices into Wi-Fi signals. Generally, a single-tone carrier signal may be provided using one or more Bluetooth device. A Wi-Fi signal (e.g. an 802.11b signal) may then be generated by a backscatter device from the single tone Bluetooth transmission.

Bluetooth devices generally use advertisement channels to broadcast information about their presence and to initiate connections. Once the connection is established with a nearby Bluetooth device, they communicate by hopping across the 36 data channels spread across the 2.4 GHz ISM band. The three advertisement channels are labeled as channels 37, 38 and 39. Since transmissions on data channels require establishing a connection with another device, Bluetooth advertisement channels may advantageously be used by helper devices described herein where we they broadcast packets. Bluetooth generally uses Gaussian Frequency Shift Keying (GFSK) modulation with a bandwidth of 1 MHz. Specifically, a '1' ('0') bit is represented by a positive (negative) frequency shift of around 250 kHz from the center frequency. The resulting FSK signal is then passed through a Gaussian filter to achieve good spectral properties.

By way of context, some general information regarding Wi-Fi will now be provided. While Wi-Fi generally refers to any of a suite of standards, examples described herein may refer to IEEE 802.11b by way of example. Other standards may be used in other examples. Wi-Fi IEEE 802.11b generally operates on three non-overlapping channels, each 22 MHz wide. To create 1 and 2 Mbps transmissions, 802.11b first XORs each data bit with a Barker sequence to create a sequence of eleven coded bits for each incoming data bit, which it then modulates using DBPSK and DQPSK. To create 5.5 and 11 Mbps transmissions, 802.11 buses CCK where each block of four incoming bits is mapped to 8-bit code words, which are then transmitted using DBPSK and DQPSK.

Examples described herein may transform Bluetooth devices into a single tone transmitter, e.g., cause a Bluetooth device to transmit a signal with constant amplitude and frequency. Accomplishing this can generally be considered to leverage two insights about GFSK modulation used in Bluetooth. First, Bluetooth uses two frequencies to encode the zero and one data bits. Thus, if a device transmits a stream of constant ones or zeros, a single frequency tone may be created. Second, passing a single tone through the Gaussian filter used by a Bluetooth device does not generally change its spectral properties since the filter only smooths out abrupt changes to the frequency. Thus, a Bluetooth device is controlled to transmit a continuous stream of zeros or ones, it may effectively produce a single tone.

Challenges may be encountered in some examples in controlling a Bluetooth device (e.g. an electronic device having a Bluetooth chipset or otherwise capable of transmitting a Bluetooth signal) to create a single tone. Those challenges may include data whitening and the link-layer packet structure.

Generally, a long sequence of either zeros or ones may be desired to be transmit such that a sufficiently long single tone may be provided for backscattering data. Bluetooth devices generally utilize data whitening, however, to avoid such sequences so as to enable accurate timing recovery on a Bluetooth receiver. Accordingly, examples of helper devices described herein may provide data for Bluetooth device transmission that cause the data whitener to produce a string of 1s and/or 0s.

Figure 3:
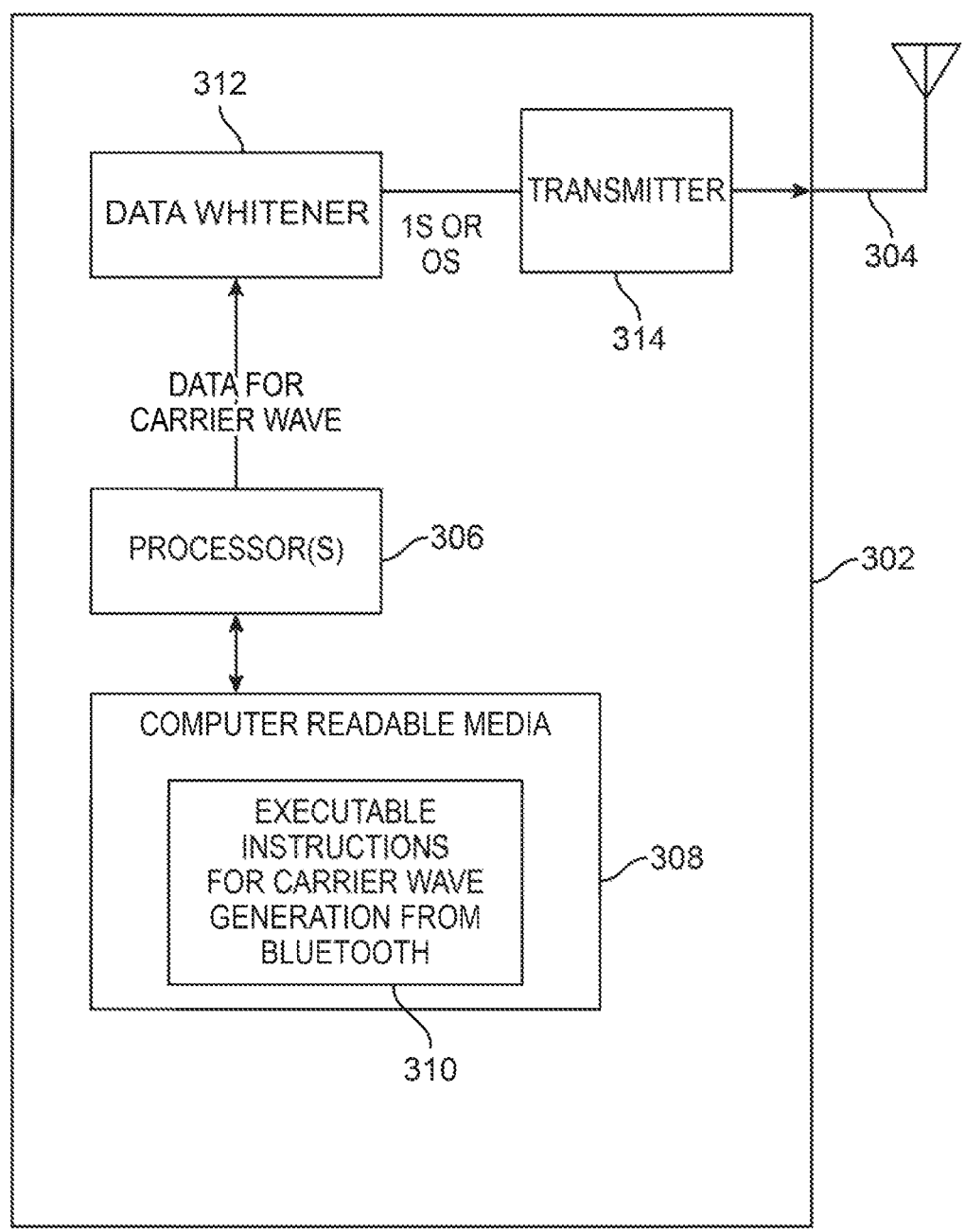
FIG. 3 is a schematic illustration of an example helper device that may utilize Bluetooth signals as a carrier wave, arranged in accordance with examples described herein.

FIG. 3 is a schematic illustration of an example helper device that may utilize Bluetooth signals as a carrier wave, arranged in accordance with examples described herein. FIG. 3 depicts helper device 302. The helper device 302 includes antenna 304, processor(s) 306, computer readable media 308, executable instructions for carrier wave generation from Bluetooth 310, data whitener 312, and transmitter 314. The data whitener 312 is in communication with the transmitter 314 which is in communication with antenna

304. The processor(s) 306 is in communication with the computer readable media 308 which may be encoded with the executable instructions for carrier wave generation from Bluetooth 310.

Generally, the helper device 302 may be implemented using any Bluetooth capable electronic device including, but not limited to, a server computer, client computer, other computer, laptop, desktop, tablet, cell phone, watch, other wearable device, appliance, automobile, aircraft, or combinations thereof.

The processor(s) 306 may be implemented using any hardware that may provide the described processing functionality, including one or more processors, or logic or other circuitry (e.g. a Bluetooth chipset).

The computer readable media 308 may be implemented using generally any electronic storage, including, but not limited to, RAM, ROM, flash, disk drive(s), or other storage. The computer readable media 308 (which may include one or more instances of computer readable media) may be encoded with the executable instructions for carrier wave generation from Bluetooth 310. The executable instructions for carrier wave generation from Bluetooth 310 may be encoded on the computer readable media 308. For example, the helper device 302 may have an application installed that may include the executable instructions for carrier wave generation from Bluetooth 310.

Figure 4:
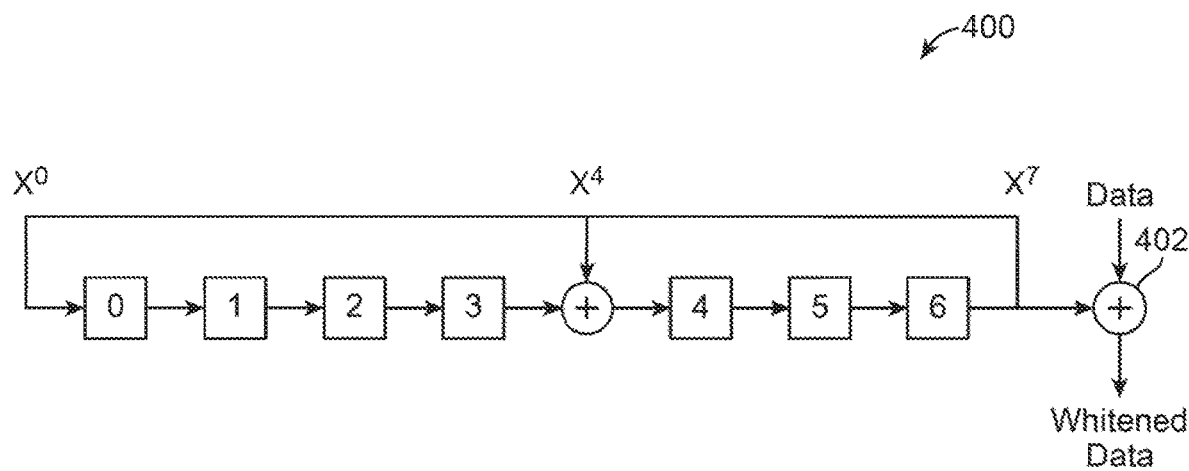
FIG. 4 is a schematic illustration of an example data whitener commonly used in Bluetooth devices.

The data whitener 312 may be implemented using any typical data whitening circuitry that may be used by Bluetooth devices. For example, an example data whitener is shown in FIG. 4. FIG. 4 is a schematic illustration of an example data whitener commonly used in Bluetooth devices. Bluetooth devices generally use the 7-bit linear feedback shift register circuit in FIG. 4 with the polynomial $x^7+x^4+1$. Given an initial state, the circuit of FIG. 4 outputs a sequence of bits (e.g. output from the register numbered 6 in FIG. 4) that are used to whiten the incoming data by XORing the data bits with the bits output by the circuit. For example, the combiner 402 may perform an XOR operation. A bit sequence is provided out of the 7-bit linear feedback shift register and is XOR'd with incoming data to provided whitened data.

Accordingly, if an initial state is known, the whitening sequence output by the 7-bit linear feedback shift register may also be known. Generally, the shift registers may be initialized with the Bluetooth channel number. For example, Bluetooth generally specifies to initialize the zeroth register to a one and the rest of the six registers to the binary representation of the Bluetooth channel number. For example, while transmitting on the Bluetooth advertising channel 37, the zeroth register in FIG. 4 may be set to 1 and the rest are set to the binary representation of 37. Thus given an advertising channel, the initialized state of the registers may be known and the whitening sequence (e.g. the series of bits output from the 7-bit linear feedback shift register circuit) may be known.

Referring again to FIG. 3, the data whitener 312 may be implemented using the data whitener 400 of FIG. 4 in some examples. The executable instructions 310 may include instructions for reversing the whitening process of the data whitener 312. For example, the executable instructions 310 may include instructions for providing data bits to the data whitener which are the same bits in the whitening sequence or its bit complement. In this manner, combining that data with the data whitening sequence may result in a sequence of zeros or ones, respectively, to be output from the data whitener and transmitted by the Bluetooth device. For example, if the processor provides data to the data whitener 312 that is equal to the data whitening sequence that will be provided by the data whitener 312, then a sequence of zeros will be provided out of the data whitener 312 after the whitening process. Similarly, if the processor provides data to the data whitener 312 that is a complement to the data whitening sequence that will be provided by the data whitener 312, then a sequence of ones will be provided out of the data whitener 312 after the whitening process. The executable instructions 310 may include instructions for determining the whitening sequence (e.g. calculating a whitening sequence that may be output by the data whitener based on an initialization).

The transmitter 314 may transmit data in accordance with a Bluetooth standard utilizing the antenna 304. As described herein, when transmitting a string of 0s and/or 1s using the Bluetooth standard, the transmitted carrier wave will generally be a single tone carrier wave. Accordingly, examples described herein may be used to provide a long (e.g. as long as possible given Bluetooth packet constraints) string of exclusively 0s or exclusively 1s to the transmitter 314. In some examples, the string of 1s or 0s may be a length of an entire Bluetooth packet payload, a length of ⅞ the Bluetooth packet payload in some examples, a length of ⅔ the Bluetooth packet payload in some examples, a length of ½ the Bluetooth packet payload in some examples. Other lengths may be used in other examples.

Figure 5:
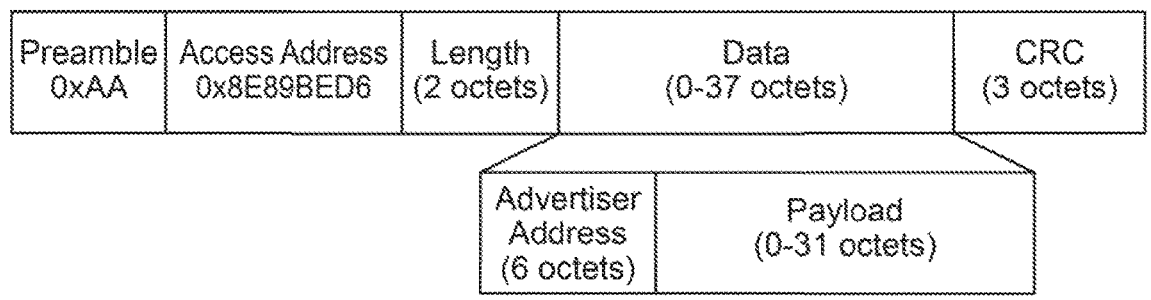
FIG. 5 is a schematic illustration of an example Bluetooth packet structure.

For example, FIG. 5 is a schematic illustration of an example Bluetooth packet structure. The Bluetooth packet 500 may include preamble, access address, length, data, and CRC bits. The data bits may include an advertiser address and a payload. It is the payload (or portions of the payload) that may be set to a string of 1s or 0s for single tone carrier wave generation described herein. Generally, the preamble and access address fields may not be arbitrarily modified. The preamble may be fixed to an alternating sequence of zeros and ones and the access address may be set to 0X8E89BED6 for advertising packets. This is followed length field and an advertiser address field. Finally, the packet has the data payload and a 3-byte CRC. Of these fields, only the payload may generally be set to arbitrary values (e.g. the 0s and 1s described herein).

Accordingly, the Bluetooth preamble, access address and the header (which may be 56 μs in total in some examples) may be used to enable Bluetooth packet detection at a backscatter device using an envelope detection circuit. The beginning of the payload may be estimated by the backscatter device and the backscatter device may begin backscattering at the estimated time of the payload start to generate, for example, Wi-Fi packets as described herein. In some examples, the Wi-Fi transmission may be completed before the start of the Bluetooth CRC field. Since the CRC may be transmitted on a different channel than the generated Wi-Fi packet, it generally does not affect the backscattered signal.

Accordingly, referring back to FIG. 2, examples of backscatter devices described herein, such as the backscatter device 200, may include an envelope detector, such as the envelope detector 216. In some examples, the envelope detector may be a very (e.g. ultra) low power envelope detector suitable for low-power backscatter device operation. The envelope detector 216 may be coupled to the antenna of the backscatter device and may detect incident energy, which may be, e.g. the start of an incident packet of a carrier wave. In some examples, the envelope detector 216 may be designed (e.g. calibrated) to provide a signal responsive to receipt of a transmission from a device within a particular radius (e.g. within 20 feet in some examples, within 15 feet in some examples, within 10 feet in some examples, within 5 feet in some examples). This may reduce false positive detections and allow the envelope detector to more accurately detect an onset of transmissions from a helper device which may be placed within the particular radius.

In some examples, accordingly, the envelope detector 216 may provide a signal responsive to detection of incident energy. The output of the envelope detector 216 may be used to provide one or more control signals to components of the backscatter device 200 such as the baseband 202, sub-carrier phase modulator 204, waveform generator 210, or combinations thereof. Components of the backscatter device may accordingly be controlled to initiate backscattering responsive to detection of a threshold amount of incident energy (e.g. an amount indicative of receipt of a carrier wave) by the envelope detector 216.

Note, however, that the envelope detector may be responsive to incident energy and may not provide an accurate indication of a beginning of a packet, e.g. a Bluetooth packet, since the preamble may not be decoded. Accordingly, synchronization operations may not be performed by the backscatter device 200, which may result in an error in accurately estimating a start of the packet payload. Accordingly, a guard interval may be used in some examples. For example, components, such as the baseband 202, sub-carrier phase modulator 204, waveform generator 210, or combinations thereof, may begin backscatter operations a guard interval after receipt of a control signal from the envelope detector 216. In other examples, the control signal may be provided by the envelope detector 216 a guard interval after the threshold amount of incident energy was detected. The guard interval may be 3 µs in some examples, 4 µs in some examples, 5 µs in some examples, 6 µs in some examples. Other guard intervals may be used in other examples.

Referring to FIG. 5, for example, the payload portion of a Bluetooth packet may be a series of all 0s or all 1s in some examples. Backscatter devices, such as the backscatter device 200 of FIG. 2, may detect a start of the Bluetooth packet 500 shown in FIG. 5 (e.g. using envelope detector 216 of FIG. 2). Responsive to detecting the Bluetooth packet, a guard interval may elapse prior to the backscatter device beginning backscatter operations. The guard interval may be selected to ensure or aid in causing the backscatter device to backscatter the payload portion of the Bluetooth packet 500 which, as described herein may be a single tone signal. The backscatter device may limit an amount of data transmitted such that the backscattered signal is completed prior to start of the CRC portion of the Bluetooth packet 500.

Generally, a Bluetooth advertising packet can have a payload up to 31 bytes or 248 µs. Since Wi-Fi packets at different bit rates may occupy the channel for different times, this translates to different packet sizes. At 2, 5.5 and 11 Mbps the Wi-Fi payload can be 38, 104, and 209 bytes within a single Bluetooth advertising packet. Given its size, however, a 1 Mbps Wi-Fi packet may not fit in (e.g. may not be produced using backscatter of) a single Bluetooth advertising packet. Note that Bluetooth data transmissions are generally around 2 ms which could in principle increase the packet sizes across all the 802.11b bit rate as well as enable 1 Mbps transmission. Examples using Bluetooth advertising packets are described herein, however, other Bluetooth packets may be used in other examples.

Bluetooth does not generally perform carrier sense before transmitting. Further, the backscattered signal (e.g. Wi-Fi packet) may be at a different frequency that could be occupied, resulting in a collision. Since Bluetooth advertisements are small and sent once every 20 ms, such collisions may have a negligible impact on Wi-Fi which operate at a much finer time granularity. Collisions however are not desirable at the backscattering device; they may require the backscattering device to retransmit its data, consuming more energy. Accordingly, examples described herein may reduce collisions using one or more strategies.

In some examples, systems may ensure that the Wi-Fi channel into which backscatter devices are backscattering is unoccupied for the backscatter duration. Since most devices have both Wi-Fi and Bluetooth, they could coordinate. For example, a helper device may have both Wi-Fi and Bluetooth transmission functionality. The helper device may transmit a CTS_to_Self packet before the Bluetooth packet which will be used as a carrier signal. The CTS_to_Self packet can reserve the channel for a duration of the Bluetooth packet preventing other Wi-Fi devices from concurrent transmissions. The ability to schedule CTS_to_Self packets may include driver and firmware access to the helper device.

In some examples, systems may leverage the fact that Bluetooth advertisement packets are sent on all Bluetooth advertising channels one after the other, separated by a fixed duration $\Delta T$ (which may be around 400 µs for TI Bluetooth chipsets). A helper device may transmit a Bluetooth advertising packet on an advertising channel, e.g. channel 37. A backscatter device may then backscatter a request to send (RTS) packet on a desired Wi-Fi channel. If the channel is free, a Wi-Fi receiving device will respond to the RTS packet with a clear to send (CTS) packet, which effectively reserves a Wi-Fi channel (e.g. Wi-Fi channel 11) for the next $2\Delta T + T_{Bluetooth}$ where $T_{Bluetooth}$ is the duration of the Bluetooth packet. A backscatter device may detect the presence of the CTS packet, e.g. using peak detection hardware such as an envelope detector. The backscatter device may then transmit data packets on the desired Wi-Fi channel using the remaining advertising packets sent on other Bluetooth channels (e.g. 38 and 39) over the next $2\Delta T + T_{Bluetooth}$ seconds.

In some examples, a data packet may be transmitted instead of the RTS packet. If the Wi-Fi receiver can decode this packet, useful data will have been exchanged. The Wi-Fi device can then send a CTS_to_Self packet reserving the channel for the next $2\Delta T + T_{Bluetooth}$, which can then be used to backscatter additional Wi-Fi packets using the two remaining advertising packets, without collisions. This may eliminate and/or reduce the energy overhead of sending a data-free RTS packet.

Examples described herein may provide for communication to backscatter devices. Achieving communication to backscatter devices may be a challenge because backscatter devices may not be able to decode Wi-Fi and Bluetooth transmissions: Bluetooth uses frequency modulation while 802.11b uses phase modulation with DBPSK/DQPSK: so both have relatively constant amplitudes. Traditional receivers for such phase/frequency modulated signals may require synthesizing a high frequency carrier that is orders of magnitude more power consuming than backscatter transmitters. In some examples, backscatter devices may include a receiver using amplitude modulation (AM) which does not require phase and frequency selectivity; unfortunately, Wi-Fi and Bluetooth radios do not support AM. Accordingly, a helper or receiver device may not transmit AM to communicate with a backscatter device generally.

Examples of electronic devices described herein may communicate data to backscatter devices by providing an AM modulated signal in a payload of Wi-Fi packets (e.g. IEEE 802.11g packets). In 802.11g, each OFDM symbol is generally generated by taking an IFFT over QAM modulated bits to generate 64 time domain samples. A time-domain OFDM symbol created from random modulated bits may be called random OFDM. The symbol created when the IFFT is performed over constant modulated bits may be called constant OFDM. While random OFDM symbols have the energy spread across the time samples; with constant OFDM, the energy is in the first time sample and is zero elsewhere. This understanding may be used to create an amplitude modulated signal. Constructing a constant OFDM symbol using Wi-Fi radios may not be straightforward however due to scrambling, coding and interleaving.

Figure 6:
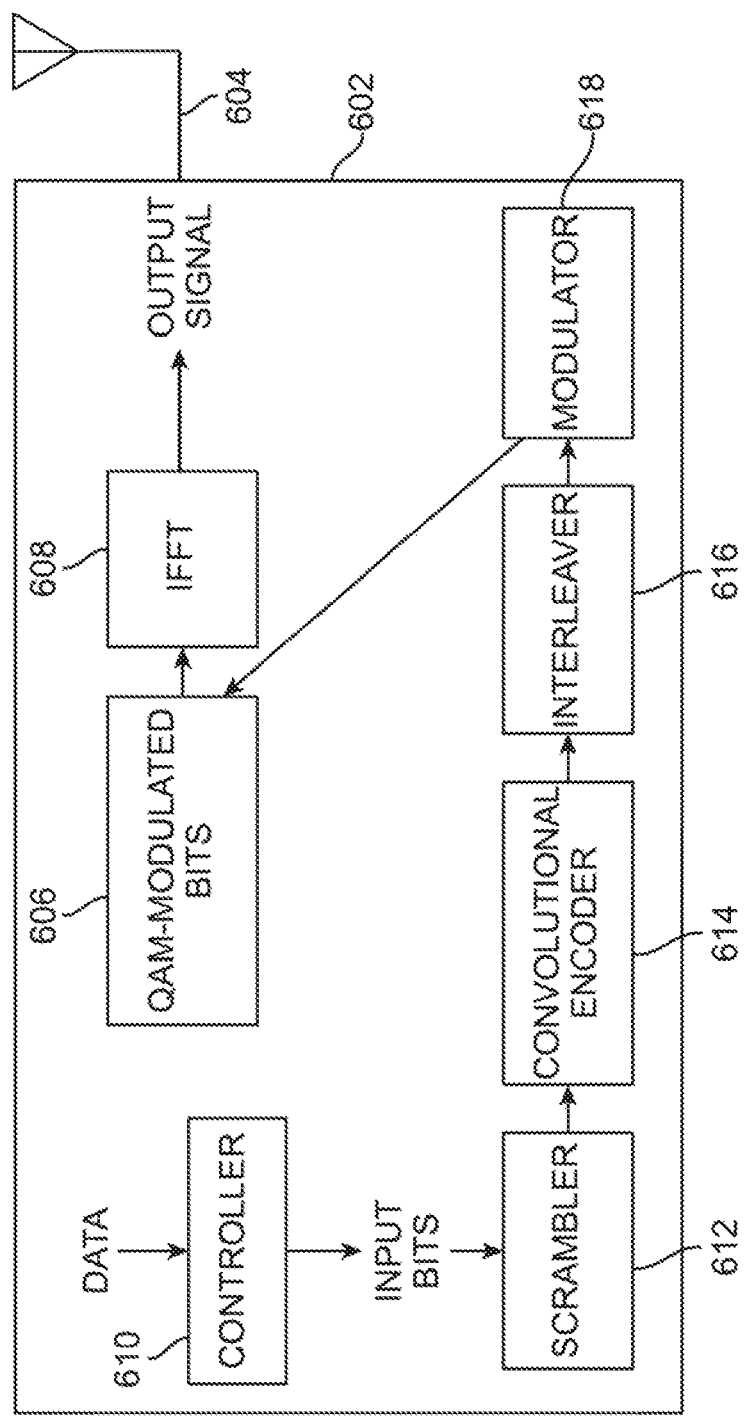
FIG. 6 is a schematic illustration of an electronic device which may be used to transmit data to a backscatter device, arranged in accordance with examples described herein.

FIG. 6 is a schematic illustration of an electronic device which may be used to transmit data to a backscatter device, arranged in accordance with examples described herein. The electronic device 602 may, for example, be implemented using (or be implemented by) a helper device and/or receiver device described herein, such as the helper device 104 of FIG. 1 and/or the receiver 106 of FIG. 1. For example, the electronic device 602 may further include components for implementing functions described herein of a helper device and/or a receiver device. Accordingly, helper devices and/or receiver devices described herein may additionally be used to communicate data to a backscatter device.

The electronic device 602 may generally include a transmitter that may transmit Wi-Fi packets and a controller that may control the transmitter to produce an amplitude modulated signal in a payload of at least one of the Wi-Fi packets. The electronic device 602 includes antenna 604. QAM-modulated bits 606, IFFT 608, controller 610, scrambler 612, convolutional encoder 614, interleaver 616, and modulator 618. The transmitter of the electronic device 602 may be said to include some or all of the components shown. Generally, the IFFT 608 operates on QAM-modulated bits 606 to provide Wi-Fi compliant (e.g. IEEE 802.11g) output signal for transmission by the antenna 604. The scrambler 612 may receive input bits and is coupled to the convolutional encoder 614, which is coupled to the interleaver 616, which is coupled to the modulator 618, which may provide the QAM-modulated bits 606. The controller 610 may provide input bits to the scrambler 612 in accordance with data that is desired to be transmitted to a backscatter device such that a desired output of QAM-modulated bits 606 is generated. For example, by changing between a random sequence of QAM-modulated bits 606 and a constant sequence of QAM-modulated bits 606, an amplitude modulated signal representative of data for transmission to a backscatter device may be provided within a Wi-Fi packet by the electronic device 602.

The use of a random sequence of QAM-modulated bits 606 may be performed generally by Wi-Fi systems. However, the use of a constant sequence of QAM-modulated bits 606 may pose a challenge. The controller 610 may select input bits that result in the generation of a constant sequence of QAM-modulated bits 606. That selection of input bits may take into account operation of the scrambler 612, convolutional encoder 614, and interleaver 616.

The scrambler 612 may be implemented using circuitry which combines the input bits with a scrambling sequence. For example, the input bits may be XOR'ed with a scrambling sequence. The scrambling sequence may be generated using a feedback shift register, such as the 7-bit linear feedback shift register shown in FIG. 4. The feedback shift register may have a seed sequence used to initiate generation of scrambling sequences. Given the seed sequence, the output sequence of the feedback shift register circuit may be deterministic. According to the Wi-Fi standard, the scrambling seed is set to a pseudorandom non-zero value. In principle, this information would be available (e.g. stored) on the Wi-Fi hardware such as the electronic device 602 of FIG. 6. A number of commercial Wi-Fi chipsets, moreover, use a fixed sequence of scrambling seeds. In some examples, the Wi-Fi chipset may allow a user to set the scrambling seed to different values in the driver. Accordingly, the controller may provide input bits which reverse an effect of the scrambler 612 by selecting a sequence of bits which, when operated on by the scrambler 612 using a scrambling sequence that has been accessed and/or derived by the controller 610, generates a sequence of constant bits (e.g. all 0s or all 1s).

802.11g uses convolutional encoding provided by the convolutional encoder 614 on the scrambled bits to be resilient to noise and interference. The convolutional encoder 614 may be a 1/2 rate convolutional encoder where two coded bits are output for each incoming scrambled bit. The higher 2/3 and 3/4 coding rates are obtained by dropping some of the 1/2 rate encoded bits. Specifically, given the scrambled bits, b[k], the two encoded bits are, $$C_1[k]=b[k]\oplus b[k-2]\oplus b[k-3]\oplus b[k-5]\oplus b[k-6]$$

$$C_2[k]=b[k]\oplus b[k-1]\oplus b[k-2]\oplus b[k-3]\oplus b[k-6]$$

This represents a 1-to-2 mapping which cannot generate every desired sequence of encoded bits. However, note that if all the incoming scrambled bits are ones (zeros), then all the encoded bits are ones (zeros). Accordingly, the convolutional encoder 614 will provide a series of ones when the output of the scrambler 612 is a series of ones and a series of zeros when the output of the scrambler 612 is a series of zeros.

The interleaver 616 interleaves the encoded bits across different OFDM frequency bins. This generally serves to make adjacent encoded bits more robust to frequency selective channel fading. Note that when a sequence of all ones or zeros is provided as encoded bits, interleaving again results in a sequence of all ones or zeros.

The modulator 618 modulates the interleaved bits in accordance with a Wi-Fi standard, e.g. using BPSK, 4QAM, 16QAM or 64QAM. Since the interleaved bits in the constant QAM-modulated bit case are all ones or zeros within an OFDM symbol, the modulation operation results in using the same constellation point across all the OFDM bins, achieving an OFDM symbol constructed using a constant modulated symbol.

Note that OFDM symbols have pilot bits inserted in specific frequency bins, which cannot be controlled. This however does not generally significantly change the desired constant OFDM pattern since the fraction of pilot to data symbols is generally low. Also, 802.11g convolutional encoders have a delay length of 7, e.g., the last six data bits from the previous OFDM symbol impact the first few encoded bits in the current OFDM symbol. This could be a problem when the constant OFDM symbol follows a random OFDM symbol. Accordingly, the last six data bits in the random OFDM symbol may use ones and the modulator may use 16/64 QAM to ensure that the random OFDM symbol is still random enough.

In this manner the electronic device 602 of FIG. 6 may provide an output signal which includes two types of symbols—random OFDM signals modulated over a random sequence of bits and constant OFDM signals modulated over a constant sequence of bits (e.g. all 1s or all 0s). The random OFDM signals have energy distributed throughout the symbol while the constant OFDM signals have a significant peak at the front of the symbol. These two states—constant and random OFDM—may be used to provide an amplitude modulated signal within a Wi-Fi packet.

The controller 610 may accordingly select a pattern of bits to provide to the spreader in accordance with the data intended to be sent to the backscatter device such that a '0' may be encoded with a particular pattern of constant and/or random OFDM symbols and a '1' may be encoded with another particular pattern of constant and/or random OFDM symbols. For example, a random OFDM symbol may be used to encode a 1 and a constant OFDM symbol may be used to represent a 0, or vice versa. However, in some examples it may not be desirably to use a single OFDM symbol to represent a 1 or a 0. For example, constant OFDM symbols may have a peak at the beginning of the time-domain symbol. This may pose a problem since a passive peak detection receiver may be used at the backscatter device that tracks the peaks in this signal. A false peak may be detected at the beginning of each constant OFDM symbol, which can confuse the receiver when there are consecutive constant OFDM symbols. Accordingly in some examples, the controller 610 may encode each bit of data with two OFDM symbols. A one bit may be represented by a random OFDM symbol followed by a constant OFDM symbol, while a zero bit may be represented as two random OFDM symbols, or vice versa. Since each 802.11g OFDM symbol is 4 μs, this achieves a bit rate of 125 kbps.

Note also that OFDM symbols have a cyclic prefix where the last few time samples are repeated at the beginning. Since the cyclic prefix in the case of a constant OFDM symbol is all zero, this could create a glitch. To avoid this, the preceding random OFDM symbol may be picked such that its last time sample has a high amplitude. This may aid in ensuring that the peak detector circuit at the backscatter device sees a high peak at the end of the first OFDM symbol and does not create a glitch during the cyclic prefix.

The controller 610 may be implemented using hardware, software, or combinations thereof. For example, the controller 610 may be implemented using logic, e.g. an field programmable gate array (FPGA). The controller 610 may be implemented using one or more processors and computer readable media encoded with executable instructions for encoding communications for backscatter devices described herein.

Figure 7:
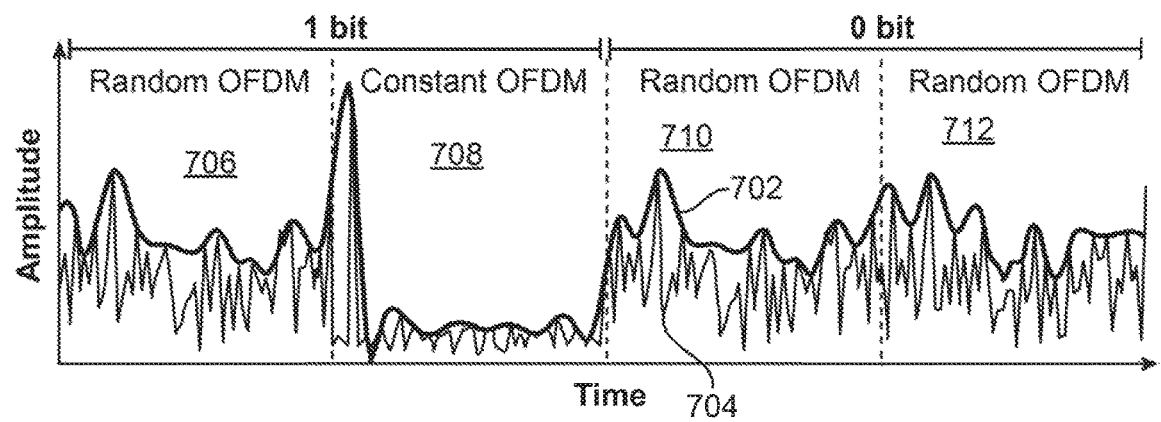
FIG. 7 is a depiction of four OFDM symbols encoding two bits for transmission to a backscatter device arranged in accordance with examples described herein.

FIG. 7 is a depiction of four OFDM symbols encoding two bits for transmission to a backscatter device arranged in accordance with examples described herein. FIG. 7 includes a 1 bit represented by random OFDM symbol 706 followed by constant OFDM symbol 708. FIG. 7 includes a 0 bit represented by random OFDM symbol 710 followed by random OFDM symbol 712. The graph of FIG. 7 shows trace 704 of amplitude over time for the four symbols. The envelope 702 may be detected by backscatter devices described herein (e.g. using the envelope detector 216 of FIG. 2). Note that the envelope of the constant OFDM symbol 708 has a significant peak at the start of the symbol allowing an envelope detector to distinguish between a constant and random OFDM symbol.

For communication in a system, a query-reply protocol may be used. An electronic device communicating Wi-Fi packets having AM signals may query a backscatter device as described herein. The backscatter device may respond by backscattering an incident carrier wave into one or more Wi-Fi signals, also as described herein. Multiple backscatter devices may be queried by electronic devices described herein, in some examples multiple backscatter devices may be queried one after the other.

Figure 8:
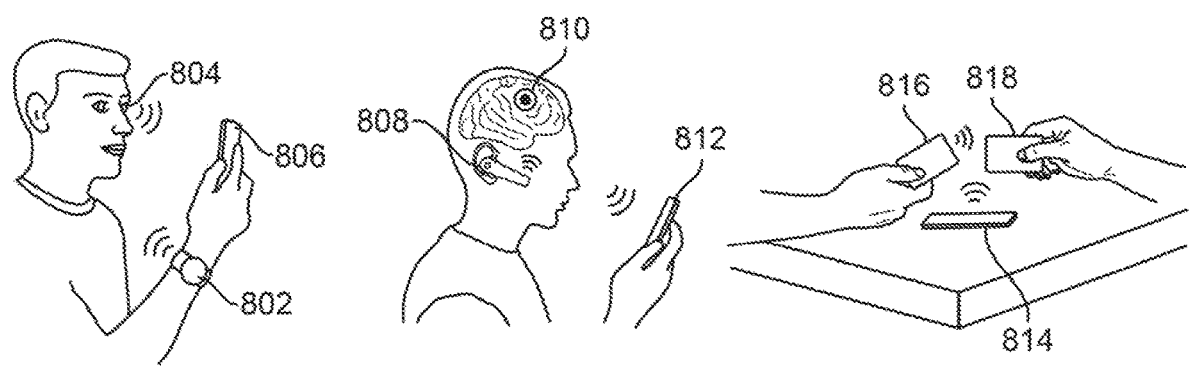
FIG. 8 is a schematic illustration of multiple example uses of systems, devices, and methods described herein.

Systems, backscatter devices, and methods described herein may be used in a variety of applications. By allowing backscatter communication to be received on commodity devices (e.g. devices that receive Wi-Fi communications), multiple application opportunities are opened and/or furthered. FIG. 8 is a schematic illustration of multiple example uses of systems, devices, and methods described herein.

Medical devices, such as wearable medical devices, may be provided with components of backscatter devices described herein and may use backscatter techniques described herein to transmit data to receivers that are able to receive Wi-Fi signals. FIG. 8 illustrates a smart contact lens 804 that may be used to implement a backscatter device described herein, such as backscatter devices described with reference to FIGS. 1 and 2. While a smart contact lens 804 is shown, other wearable medical sensors may also be used. A helper device, which may be implemented by smart watch 802 of FIG. 8, may transmit a carrier wave to the smart contact lens 804, which may be a Bluetooth signal. The smart contact lens 804 may backscatter the carrier wave to provide backscattered signals in accordance with a Wi-Fi standard. The backscattered signals may include sensor data from the smart contact lens 804. For example, smart contact lens systems or other wearable medical devices may measure biomarkers such as glucose, cholesterol and sodium in tears or other bodily fluids or tissues and can help with unobtrusive tracking for diabetic or other patients. The smart contact lens 804 may include a miniature glucose sensor. IC, and an antenna. Although the power required for glucose sensing may be minimal, real-time communication is power consuming and may rule out conventional radios. Today these systems are limited to periodically sampling and storing the glucose data that is then transmitted sporadically using backscatter whenever the lens is next to a dedicated powered RFID-like reader. Using backscatter techniques described herein may advantageously allow the smart contact lens 804 to transmit data in a low power manner in a format that may be readily received by commodity devices. For example, a smart phone 806 in FIG. 8 may receive transmissions from the smart contact lens 804. Generally, any Wi-Fi enabled device may be used to receive transmission from the smart contact lens 804.

Another example of applications include implantable neural recording devices, which have demonstrated promising results towards use in brain computer interfaces (BCIs) that may, for example, help paralyzed individuals operate motor prosthetic devices, command electronic devices, or even regain control of their limbs. FIG. 8 illustrates an implantable neural recording device 810 that may be used to implement a backscatter device described herein, such as backscatter devices described with reference to FIGS. 1 and 2. Generally, implantable neural recording devices use either penetrating neural probes or a surface electrode grid that is implanted to collect local field potentials and Electrocorticography (ECoG) signals. The recording sensors today may consume around 2 μW/channel, with 8-64 parallel recording channels.

Implantable neural recording devices, such as the implantable neural recording device 810 may be provided with components of a backscatter device as described herein. A helper device, e.g. electronic device 808 of FIG. 8, may transmit a carrier wave, which may be a Bluetooth signal as described herein. The implantable neural recording device 810 may backscatter the carrier wave to form Wi-Fi packets that may include data collected by the implantable neural recording device 810. The Wi-Fi packets generated by the implantable neural recording device 810 may be received by any electronic device capable of receiving Wi-Fi signals, such as the smartphone 812 in FIG. 8. This may avoid a need for a custom backscatter reader.

In some examples, systems and device described herein may be used for communication between two passive cards (e.g. credit or other cards). Communication between cards may utilize single-sideband backscatter techniques described herein. Since many users have Bluetooth-enabled devices (e.g., a smartphone), cards including backscatter device components described herein may assist with money transfer between credit cards, bus passes, splitting of a check between multiple people and transferring the content between digital paper technology, for example.

FIG. 8 illustrates cards 816 and 818. A helper device, such as the smartphone 814, may provide a carrier wave, such as a Bluetooth signal described herein. The cards 816 and 818 may be provided with backscatter device components described herein, for example the cards 816 and/or 818 may each be used to implement backscatter devices described herein, such as with respect to FIGS. 1 and 2. The cards 816 and/or 818 may backscatter the carrier wave to provide a backscattered signal that may include data stored on the card, including but not limited to, account number, user name, account balance, price, debit amount, or combinations thereof. The backscattered signal may be received by the other card in some examples. For example, a card may be configured to receive at times corresponding to a single-tone section of a Bluetooth signal provided by the smartphone 814 (which may be during a time the other card may be backscattering). An energy detector (e.g. envelope detector) provided on the card may be used to synchronize it with the Bluetooth transmissions.

In this manner, data may be exchanged between two cards. To utilize such a method, a user may interface with an application of the smartphone 814 and indicate to begin carrier wave transmission. The smartphone 814 may be placed in proximity (e.g. within a foot) of the cards 816 and 818. Without a carrier wave transmission, in some examples, no communication may occur between the cards 816 and 818. Once the carrier wave transmission begins, the card 816 may backscatter the carrier wave to transmit data to the card 818. Once a transaction is complete, a user may interface with the application of the smartphone 814 to stop carrier wave transmission.

In some examples, the cards 816 and/or 818 may provide backscatter signals that may be received by another electronic device. In some examples, the card 816 and/or the card 818 may selectively backscatter packets that are provided by a helper device (e.g. the smartphone 814) in order to send data, rather than encoding the data itself into a backscattered signal. For example, a helper device may transmit a number of packets. When the card is actively backscattering, it may shift the frequency of the packet such that the receiver device may not receive the packet. When the card is not actively backscattering, the packet may be received by the receiver device. In this manner, the card may encode one bit per packet by enabling and/or disabling its backscattering capability.

In some examples, the smartphone 814 may generate packets at regular time intervals. A receiver device may decode the data by checking whether a packet was received or not in each time interval. In some examples, the smartphone 814 or other helper device may include a sequence number in each packet that is transmitted (e.g. a sequence number may be a number incremented for each packet). A receiving device may put the sequence numbers of received packet in increasing order and may decode the message by determining which of the sequence numbers were received and which were not. For example, if a packet with a sequence number I is received, it means that bit I of the received message is 1; if the packet with sequence number I is not received, that means that bit I of the received message is 0 (or vice versa).

In some examples, other techniques may be used to distinguish packets that went missing due to errors and packets intentionally lost due to backscattering. For example, a single message bit could be encoded by pairs of sequence numbers. Each pair of packets may contain one odd sequence number and one even sequence number. To encode a 0, the card may jam the packet with the odd sequence number; to encode a 1, the card may jam the packet with the even sequence number (or vice versa). If two sequential sequence numbers were received, or if two sequential sequence numbers went missing, it would mean that either an error has occurred or that the card has not attempted to use the backscatter jamming communication channel.

Example Implementations

An example backscatter device was implemented using a FPGA platform to characterize the system and build proof of concept applications. The design was then translated into an IC and used to quantify the power consumption.

The FPGA design had two components: the RF front end and the baseband digital circuit. The front end included a backscatter modulator and a passive receiver. The receiver was isolated from the antenna using a SPDT switch that switched between transmit and receive modes. The backscatter modulator switched between four impedance states and was implemented using a cascaded two-stage SPDT throw switch network. An HMC190BMS8 SPDT throw switch was used both for isolating the transmitter and receiver and in the backscatter modulator. The front end was implemented on a low loss Rodgers 4350 substrate. The impedances connected to the four terminals of the switch network were optimized to achieve the four complex values described herein. In this implementation, a 3 pF capacitor, open impedance, 1 pF and 2 nH were used to get the four complex values. The receiver (e.g. envelope detector as labeled in FIG. 2) was an energy detector including passive analog components and a comparator to distinguish between the presence and absence of energy. 802.11b scrambling, DSSS/CCK encoding, CRC encoding. DQSPK encoding and single-side band backscatter were written in Verilog and translated onto the DE1 Cyclone II FPGA development board by Altera. A 35.75 MHz shift was implemented which may be advantageous for rejecting the interference from the Bluetooth RF source. The digital output of the FPGA was connected to the backscatter modulator and the energy detector was fed to its digital input. A 2 dBi antenna was used on the interscatter device.

An integrated circuit (IC) design was also generated. As CMOS technology scaled, the power consumption of digital computation has significantly reduced. Unfortunately, active radios require power hungry analog components which operate at RF frequencies and generally do not scale in either power or area Interscatter relies exclusively on baseband digital computation with generally no components operating at RF frequencies; so it can leverage CMOS scaling for ultra-low power operations. Interscatter was implemented on a TSMC 65 nm low power CMOS technology node. For context, Atheros AR6003 chipsets released in 2009 used 65 nm CMOS. The interscatter IC implementation can be broken down into three main components.

1. Frequency synthesizer. This block takes a frequency reference as an input and generates the 802.11b baseband 11 MHz as well as the four phases of the 35.75 MHz frequency offset used for backscatter. An integer N charge pump and ring oscillator based PLL was used to generate a 143 MHz clock which was fed to a Johnson counter to generate the four phase of 35.75 MHz frequency shift. The same 143 MHz clock was divided by 13 to generate the 11 MHz baseband clock. Thus, 11 MHz and 35.75 MHz are phase synchronized to avoid glitches. This block consumed 9.69 µW of power.

2. Baseband processor. This block takes the payload as the input and generates the baseband 802.11b packet. The same Verilog code was used which was verified on the FPGA and transistor level implementation was synthesized using a Design Compiler tool by Synopsis. This block had a power consumption of 8.51 µW for 2 Mbps Wi-Fi transmissions.

3. Backscatter modulator. A single side band backscatter was implemented in the digital domain by independently generating the in-phase and quadrature phase components. The two bit output of the baseband processor was taken and fed to two multiplexers that mapped to the four phases of the 35.75 MHz carrier to corresponding in-phase and quadrature-phase components. Then at each time instant, the in-phase and quadrature phase component was mapped to the four impedance states described herein. CMOS switches were used to choose between open, short, capacitive and inductive states. The single side band backscatter modulator consumed 9.79 µW. In total, generating 2 Mbps 802.11b packets consumed 28 µW.

Experiments were run with three different Bluetooth devices: Texas Instruments CC2650, Moto 360 2nd gen smart watch, and a Samsung Galaxy S5. TI chipsets exposed an antenna connector, which was connected directly to a spectrum analyzer and data was recorded during the payload section of a Bluetooth packet. The Android platforms did not expose such connectors for external antennas. So instead the same experiment was performed using a 2 dBi monopole antenna on the spectral analyzer to receive the Bluetooth transmissions. The application layer data was set as described herein to create a single tone.

In some experiments, the backscatter device was set to generate 2 Mbps Wi-Fi packets on channel 11. The Bluetooth transmitter sent advertising packets with a 31 byte payload on BLE channel 38, once every 40 ms. A TI Bluetooth device and an Intel Link 5300 Wi-Fi card were used as Bluetooth transmitter and Wi-Fi receiver respectively. Four power values at the Bluetooth transmitter were used: 1) 0 dBm which is the typical configuration for Bluetooth devices, 2) 4 dBm, which is supported for Samsung S6 and One Plus 2, 3) 10 dBm, which is supported by Samsung Note 5 and iPhone 6, and 4) 20 dBm which is supported by class 1 Bluetooth devices.

In some experiments, the backscatter device consecutively transmitted 200 unique sequence numbers in a loop that was used to compute the error rate the Wi-Fi receiver. The packet error rate was computed for both 2 and 11 Mbps Wi-Fi transmissions. For 2 Mbps and 11 Mbps, packets were generated with a payload of 31 and 77 bytes respectively so as to fit within a Bluetooth advertising packet.

In some experiments, an AM modulated signal was created using OFDM by setting the appropriate modulated bits on each OFDM symbol. Recall this may require knowledge of the scrambling seed that is used by the Wi-Fi transmitter. Experiments were run to track the scrambling seed used by three different Wi-Fi platforms: Samsung Galaxy S5, Linksys WRT54GL and Atheros AR5007G cards. 802.11g packets were transmitted at a bit rate of 36 Mbps from each of these WI-Fi devices. Since existing Wi-Fi receiver do not expose the scrambling seed, the gr-ieee802-11 package was used in GNURadio which implements the complete 802.11g receive chain and provides detailed access to the scrambling seed information. Experiments revealed that after association both Samsung Galaxy S5 and the Linksys WRT54GL router use a fixed scrambling seed. It was also noticed that the Atheros 5 k cards randomly change the scrambling seed across the packets. However the GEN_SCRAMBLER field in the AR5K_PHY_CTL register of the ath5 k driver could be set to use a fixed scrambler seed.

36 Mbps 802.11g packets scrambled with a known seed were transmitted at a transmit power of 20 dBm, which is supported by Android smartphones using third-party apps. The Wi-Fi transmitter was configured to send a pre-defined repeating sequence of bits using the encoding described herein. The low-power receiver was moved away from the Wi-Fi transmitter to compute the observed bit error rate at each location.

In some examples, ZigBee signals were generated by backscattering Bluetooth transmissions. ZigBee operates in the 2.4 GHz band over 16 channels where each channel is 5 MHz long. At the physical layer, ZigBee achieves bit rates of 250 kbps using DSSS coding and offset-QPSK and may have a better noise sensitivity than Wi-Fi. Techniques described herein to generate 802.11b signals using DSSS and QPSK were adapted to generate ZigBee-compliant packets.

The TI CC2650 Bluetooth device was used as a Bluetooth transmitter on advertising channel 38 and a backscatter device was set to generate packets on channel 14, e.g., 2.420 GHz. The TI CC2531 was used as a commodity ZigBee receiver to receive the packets generated by the backscatter device. The backscattering device was placed two feet away from the Bluetooth transmitter and the Zig-Bee receiver at five different locations up to 15 feet from the backscatter device. Note that existing ZigBee transmitters consume tens of milliwatts of power when actively transmitting. In contrast, a backscatter based approach described herein would consume tens of microwatts while transmitting a packet and could be beneficial for short range communication with nearby ZigBee devices.

In some examples, techniques described herein may be used to generate Bluetooth low energy packets from continuous wave transmissions and/or Bluetooth transmissions. Bluetooth low energy operated in the 2.4 GHz band with three advertising channels 37, 38 and 39 and used frequency shift keying (FSK) at the physical layer. Techniques that implement phase shift keying have been described herein and have been adapted to do frequency shift keying. Intuitively, frequency shift keying may be considered time varying phase shift keying and was implemented by offsetting the frequency of the carrier by +250 kHz for '1' bit and −250 kHz for '0' bit. Techniques described herein were used to generate Bluetooth packets without a mirror copy.

Accordingly, techniques described herein may be used to generate Wi-Fi, ZigBee, Bluetooth and/or ANT (which uses same physical layer as Bluetooth) packets without a mirror copy (e.g. single side band backscatter) form either continuous wave signals and/or Bluetooth transmissions. Additionally, the same techniques may be used to create single side band RFID and other signals from either continuous waves transmissions or other RF sources.

From the foregoing it will be appreciated that, although specific embodiments of the invention have been described herein for purposes of illustration, various modifications may be made without deviating from the spirit and scope of the invention.

What is claimed is:

1. A backscatter device comprising:
   an antenna configured to backscatter a carrier signal having a first frequency;
   baseband circuitry configured to provide data for transmission, including an in-phase component and a quadrature component;
   a waveform generator configured to provide a waveform having a second frequency, wherein the second frequency is an absolute difference between the first frequency and a third frequency;
   a sub-carrier phase modulator coupled to the baseband circuitry and the waveform generator, the sub-carrier phase modulator configured to adjust a phase, amplitude, or combinations thereof, of the waveform in accordance with the data to provide an output signal, and
   a switch coupled to the antenna, the switch configured to:
   control an impedance of the backscatter device to backscatter the carrier signal in accordance with the output signal such that the first frequency is mixed with the second frequency to transmit the data in a backscatter signal in a single sideband at the third frequency, and
   control the impedance of the backscatter device to imitate multiplication of the in-phase component and the quadrature component with a complex signal.

2. The backscatter device of claim 1, wherein the backscatter signal is arranged in accordance with a wireless communication protocol implementing phase-shift keying, amplitude-shift keying, or combinations thereof.

3. The backscatter device of claim 2, wherein the wireless communication protocol comprises Wi-Fi, ZigBee, SigFox, or combinations thereof.

4. The backscatter device of claim 1, wherein the waveform comprises two square waves including a first square wave and a second square wave, the second square wave shifted one quarter phase from the first square wave.

5. The backscatter device of claim 1, wherein the data comprises a Wi-Fi packet.

6. The backscatter device of claim 1, further comprising a plurality of impedance elements, and wherein the switch is configured to switch between the plurality of impedance elements.

7. The backscatter device of claim 1, wherein the switch is configured to control the impedance of the backscatter device to transmit the data in the backscatter signal in the single sideband at the third frequency, wherein the third frequency is equal to the first frequency plus the second frequency without transmitting another sideband at a fourth frequency equal to the first frequency minus the second frequency.

8. The backscatter device of claim 1, wherein the backscatter device is configured to switch between four different impedances to backscatter the carrier signal.

9. The backscatter device of claim 1, wherein the switch is further configured to control the impedance of the backscatter device to switch between at least four complex impedance states each having real and imaginary components to backscatter the carrier signal.

10. The backscatter device of claim 1, wherein the switch is further configured to control the impedance of the backscatter device to provide the complex signal.

11. The backscatter device of claim 9, wherein each of the at least four complex impedance states comprise a real value corresponding to the in-phase component and an imaginary value corresponding to the quadrature component.

* * * * *